(12) United States Patent
Dayanand

(10) Patent No.: US 12,421,831 B2
(45) Date of Patent: Sep. 23, 2025

(54) UTILIZING HIGH PRESSURE SUBSEA RESERVOIR ENERGY TO SUPPORT LOW-PRESSURE SUBSEA PRODUCTION WELLS

(71) Applicant: Chevron U.S.A. Inc., San Ramon, CA (US)

(72) Inventor: Nikhil Dayanand, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/835,105

(22) PCT Filed: Feb. 2, 2022

(86) PCT No.: PCT/US2022/014809
§ 371 (c)(1),
(2) Date: Aug. 1, 2024

(87) PCT Pub. No.: WO2023/149867
PCT Pub. Date: Aug. 10, 2023

(65) Prior Publication Data
US 2025/0163780 A1    May 22, 2025

(51) Int. Cl.
*E21B 43/017* (2006.01)
*E21B 47/06* (2012.01)
(Continued)

(52) U.S. Cl.
CPC ............ *E21B 43/017* (2013.01); *E21B 47/06* (2013.01); *F01D 15/08* (2013.01); *F16K 27/003* (2013.01)

(58) Field of Classification Search
CPC ........ E21B 43/017; E21B 47/06; F01D 15/08; F16K 27/003
See application file for complete search history.

(56) References Cited

U.S. PATENT DOCUMENTS 5,899,273 A * 5/1999 Jung ...................... E21B 43/124
166/267
7,093,661 B2 * 8/2006 Olsen .................. E21B 43/0175
166/266

(Continued)

OTHER PUBLICATIONS

Harry Kim, PCT International Search Report, May 3, 2022, 2 pages, US as receiving office.

(Continued)

*Primary Examiner* — Matthew R Buck
(74) *Attorney, Agent, or Firm* — Smith & Woldesenbet Law Group, PLLC

(57) ABSTRACT

A system for utilizing high pressure subsea reservoir energy to support low-pressure subsea production wells can include a high-pressure subsea well in production, a first subsea piping that receives a high-pressure fluid of the high-pressure subsea well, a low-pressure subsea well in production, and a second subsea piping that receives a low-pressure fluid of the low-pressure subsea well. The system can also include a subsea regenerative turbine that receives the high-pressure fluid of the high-pressure subsea well from the first subsea piping. The system can further include a subsea pump assembly that operates using energy generated by the subsea regenerative turbine, where the subsea pump assembly helps move the low-pressure fluid of the low-pressure subsea well through the second subsea piping.

20 Claims, 9 Drawing Sheets

(51) Int. Cl.
    *F01D 15/08*          (2006.01)
    *F16K 27/00*          (2006.01)

(56)             References Cited

U.S. PATENT DOCUMENTS

| | | | |
|---|---|---|---|
| 8,893,803 B1* | 11/2014 | Lugo | E21B 43/013 |
| | | | 166/347 |
| 10,208,558 B2 | 2/2019 | Meek et al. | |
| 2018/0133621 A1* | 5/2018 | Titley | B01D 19/0063 |
| 2021/0372243 A1* | 12/2021 | Arukhe | F03G 7/122 |
| 2022/0290541 A1* | 9/2022 | Moreira Branco | E21B 43/01 |

OTHER PUBLICATIONS

Harry Kim, Written Opinion of the International Search Authority, May 3, 2022, 7 pages, US as receiving office.

* cited by examiner

UTILIZING HIGH PRESSURE SUBSEA RESERVOIR ENERGY TO SUPPORT LOW-PRESSURE SUBSEA PRODUCTION WELLS

CROSS-REFERENCE TO RELATED APPLICATIONS

This application claims priority under 35 U.S.C. § 371 to Patent Cooperation Treaty Patent Application Serial Number PCT/US2022/014809, titled "Utilizing High Pressure Subsea Reservoir Energy To Support Low-Pressure Subsea Production Wells" and filed on Feb. 2, 2022, the entire contents of which are hereby incorporated herein by reference.

TECHNICAL FIELD

The present application is related to offshore field operations and, more particularly, to systems and methods for systems and methods for utilizing high pressure subsea reservoir energy to support low-pressure subsea production wells.

BACKGROUND

In subsea field operations, one or more subassemblies or stand-alone components are placed on the sea floor for use in one or more stages (e.g., exploration, completion, production) of a field operation. In production, each well starts at a relatively high pressure. Over time, the pressure of that well declines. If the pressure of a well drops too low, the flow is not sufficient to sustain production unless an ancillary subassembly or component such as a pump can be used to support the pressure of that well. New wells are planned and installed in anticipation of this decline in established wells at different locations of the same or a different reservoir. The pressure of the new wells is usually minimally influenced by the pressure decline in the prior wells.

SUMMARY

In general, in one aspect, the disclosure relates to a system for utilizing high pressure subsea reservoir energy to support low-pressure subsea production wells. The system can include a high-pressure subsea well in production, and a first subsea piping that receives a high-pressure fluid of the high-pressure subsea well. The system can also include a low-pressure subsea well in production, and a second subsea piping that receives a low-pressure fluid of the low-pressure subsea well. The system can further include a subsea regenerative turbine that receives the high-pressure fluid of the high-pressure subsea well from the first subsea piping. The system can also include a subsea pump assembly that operates using energy generated by the subsea regenerative turbine, where the subsea pump assembly helps move the low-pressure fluid of the low-pressure subsea well through the second subsea piping.

In another aspect, the disclosure relates to a method for utilizing high pressure subsea reservoir energy to support low-pressure subsea production wells. The method can include identifying a high-pressure fluid of a high-pressure subsea well in production and having a first pressure that exceeds a range of operational delivery pressure values. The method can also include facilitating flow of the high-pressure fluid of the high-pressure subsea well through a first path in subsea piping to a subsea regenerative turbine. The method can further include directing energy generated by the subsea regenerative turbine to a subsea pump assembly. The method can also include identifying a low-pressure subsea well in production and having a second pressure that falls below the range of operational delivery pressure values. The method can further include facilitating flow of a low-pressure fluid of the low-pressure subsea well through a second path in the subsea piping with assistance from the subsea pump assembly, where the subsea pump assembly operates using energy generated by the subsea regenerative turbine when the high-pressure fluid of the high-pressure subsea well flows therethrough.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1:
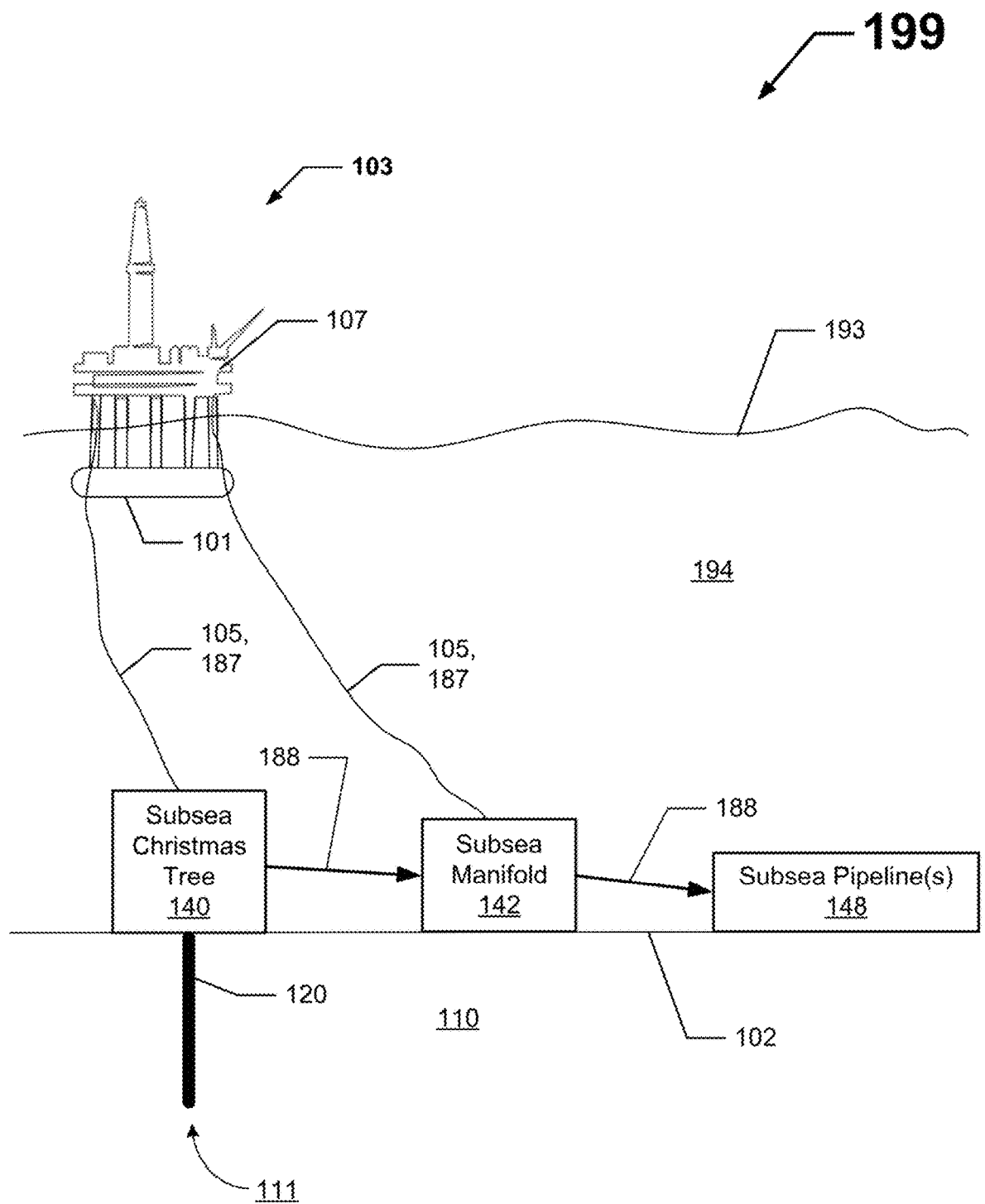
FIG. 1 shows a subsea field system in which example embodiments can be used.

The example embodiments discussed herein are directed to systems and methods for utilizing high pressure subsea reservoir energy to support low-pressure subsea production wells. Subsea field operations can involve drilling, completing, transporting, and/or producing a subterranean resource that is extracted from a subterranean formation. Examples of a subterranean resource can include, but are not limited to, natural gas, oil, and water. A subsea field operation can last for any duration of time (e.g., one month, one year, five years, one decade) and can be continuous or have multiple interruptions or pauses. Example embodiments of systems and methods for utilizing high pressure subsea reservoir energy to support low-pressure subsea production wells can be rated for use in hazardous environments. The systems (including portions thereof) with which example embodiments can be used are located, at least in part, under water (e.g., a sea, an ocean, a lake), also called subsea herein.

Example embodiments used for utilizing high pressure subsea reservoir energy to support low-pressure subsea production wells include multiple components, where a component can be made from a single piece (as from a cast, a mold, from a 3D printing process, or an extrusion). When a component (or portion thereof) of an example embodiment is made from a single piece, the single piece can be cut out, bent, stamped, and/or otherwise shaped to create certain features, elements, or other portions of the component. Alternatively, a component (or portion thereof) of an example embodiment can be made from multiple pieces that are mechanically coupled to each other. In such a case, the multiple pieces can be mechanically coupled to each other using one or more of a number of coupling methods, including but not limited to adhesives, welding, fastening devices (e.g., bolts), compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example system for utilizing high pressure subsea reservoir energy to support low-pressure subsea production wells) can be made of one or more of a number of suitable materials, including but not limited to metal (e.g., stainless steel), ceramic, rubber, glass, and plastic.

When used in certain systems (e.g., for certain subsea field operations), example embodiments can be designed to help such systems comply with certain standards and/or requirements. Examples of entities that set such standards and/or requirements can include, but are not limited to, the Society of Petroleum Engineers, the American Petroleum Institute (API), the International Standards Organization (ISO), the International Association of Classification Societies (IACS), and the Occupational Safety and Health Administration (OSHA). Also, as discussed above, example systems for evaluating securing systems for floating structures using virtual sensors can be used in hazardous environments, and so example systems for utilizing high pressure subsea reservoir energy to support low-pressure subsea production wells can be designed to comply with industry standards that apply to hazardous environments.

If a component of a figure is described but not expressly shown or labeled in that figure, the label used for a corresponding component in another figure can be inferred to that component. Conversely, if a component in a figure is labeled but is not described, the description for such component can be substantially the same as the description for the corresponding component in another figure. The numbering scheme for the various components in the figures herein is such that each component is a three-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings can be capable of being included in one or more claims that correspond to such one or more particular drawings herein.

Example embodiments of systems for utilizing high pressure subsea reservoir energy to support low-pressure subsea production wells will be described more fully hereinafter with reference to the accompanying drawings, in which example embodiments of systems for utilizing high pressure subsea reservoir energy to support low-pressure subsea production wells are shown. Utilizing high pressure subsea reservoir energy to support low-pressure subsea production wells may, however, be embodied in many different forms and should not be construed as limited to the example embodiments set forth herein. Rather, these example embodiments are provided so that this disclosure will be thorough and complete, and will fully convey the scope of systems for utilizing high pressure subsea reservoir energy to support low-pressure subsea production wells to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of systems for utilizing high pressure subsea reservoir energy to support low-pressure subsea production wells. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a field system 199 in which example embodiments can be used. The system 199 in this case includes a floating structure 103 in the form of a semi-submersible platform that floats in a large and deep body of water 194. Part (e.g., the topsides 107) of the floating structure 103 is above the water line 193, and at least part (e.g., part of the hull 101) of the rest of the floating structure 103 is in the water 194 below the water line 193. The floating structure 103 in this case is used for subterranean field operations (also called subsea field operations herein), in which exploration and production phases (also called stages) of the subsea field operation are executed to extract one or more subterranean resources 111 (e.g., oil, natural gas, water, hydrogen gas) from and/or inject resources (e.g., carbon monoxide) into the subterranean formation 110 via a wellbore 120.

In alternative embodiments, as when a subsea operation is close to land, the structure 103 can be land-based rather than floating. Further, in some cases, a field operation involves multiple wellbores 120 that originate from the same proximate location (sometimes called a pad) on the seabed 102. In such cases, the wellbores 120 are drilled and produced one at a time, which means that with all else being equal among the wellbores 120, the oldest wellbore 120 on production has a lower pressure compared to the pressure of the newest wellbore 120 on production. Also, in such cases, there can be one Christmas tree 140 for each wellbore 120.

To extract a subterranean resource 111 from a wellbore on production, a subsea Christmas tree 140 is disposed toward the top of the wellbore 120 at the seabed 102. Piping 188 transfers the subterranean resource 111 from the subsea Christmas tree 140 to a subsea manifold 142. Additional piping 188 transfers the subterranean resource 111 from the subsea manifold 142 to one or more subsea pipelines 148. There can be one or more of a number of components and/or systems (e.g., a subsea pump, a subsea compressor, a subsea process cooler) positioned between a subsea Christmas tree 140 and the subsea pipelines 148 to assist in extracting the subterranean resource 111. There can be one or more communication links 105 and/or power transfer links 187 between one or more of the subsea components (e.g., the subsea Christmas tree 140, the subsea manifold 142, one or more of the subsea pipelines 148) and one or more components (e.g., a generator, a controller) disposed on the topsides 107 of the floating structure 103 (or land-based structure 103, as the case may be).

The subsea Christmas tree 140 is a stack of vertical and horizontal valves, spools, pressure gauges, chokes, and/or other components installed as an assembly on a subsea wellhead. The subsea Christmas tree 140 is configured to provide a controllable interface between the wellbore 120 and production facilities (e.g., via the subsea pipeline 148). The various valves of the subsea Christmas tree 140 can be used for such purposes as testing, servicing, regulating, and/or choking the stream of produced subterranean resources 111 coming up from the wellbore 120.

The subsea manifold 142 is an assembly of headers, pipes (e.g., pipes 188) and valves. The subsea manifold 142 is configured to transfer the subterranean resources 111 from the subsea Christmas to one or more of the subsea pipelines 148. In some ways, the subsea manifold 142 acts as a type of flow regulator to distribute the subterranean resource 111 among the various subsea pipelines 148. Similarly, if there are multiple wellbores 120, as from a common pad, the subsea manifold 142 can receive the subterranean resource 111 from one or more of those wellbores 120 and distribute the subterranean resource 111 to one or more of the subsea pipelines 148.

Each subsea pipeline 148 (also sometimes called a submarine pipeline 148) is a series of pipes, coupled end to end, that is laid at or near to the seabed 102. A subsea pipeline 148 moves the subterranean resource 111 from the area of the wellbore 120 to some other location, typically for a midstream process (e.g., oil refining, natural gas processing). The piping 188, also located subsea, can include multiple pipes, ducts, elbows, joints, sleeves, collars, and similar components that are coupled to each other (e.g., using coupling features such as mating threads) to establish a network for transporting the subterranean resource 111 from the subsea Christmas tree 140, through the subsea manifold 142, to one or more of the subsea pipelines 148. Each component of the piping 188 can have an appropriate size (e.g., inner diameter, outer diameter) and be made of an appropriate material (e.g., steel) to safely and efficiently handle the pressure, temperature, flow rate, and other characteristics of the subterranean resource 111 at the depth in the water 194.

Each communication link 105 can include wired (e.g., Class 1 electrical cables, electrical connectors, Power Line Carrier, RS485) and/or wireless (e.g., sound or pressure waves in the water 194, Wi-Fi, Zigbee, visible light communication, cellular networking, Bluetooth, Bluetooth Low Energy (BLE), ultrawide band (UWB), WirelessHART, ISA100) technology. A communication link 105 can transmit signals (e.g., communication signals, control signals, data) from one component (e.g., a controller) of the system 199 to another (e.g., a valve on the subsea Christmas tree 140).

Each power transfer link 187 can include one or more electrical conductors, which can be individual or part of one or more electrical cables. In some cases, as with inductive power, power can be transferred wirelessly using power transfer links 187. A power transfer link 187 can transmit power from one component (e.g., a battery, a generator) of the system 199 to another (e.g., a motor on the subsea manifold 142). Each power transfer link 187 can be sized (e.g., 12 gauge, 18 gauge, 4 gauge) in a manner suitable for the amount (e.g., 480V, 24V, 120V) and type (e.g., alternating current, direct current) of power transferred therethrough. In this case, the communication links 105 and the power transfer links 187 are in the form of electrical cables.

In many cases, the subterranean resource 111 is extracted from the subterranean formation 110 through the wellbore 120 at a relatively high pressure. In such cases, the pressure of the subterranean resource 111 needs to be lowered to within a range of acceptable values before the subterranean resource 111 can be delivered to and transported through the subsea pipeline 148. A common way to reduce the pressure of the subterranean resource 111 is to use a choke (a type of valve) at the Christmas tree 140 so that the subterranean resource 111 can safely be delivered to the subsea pipeline 148.

Figure 2:
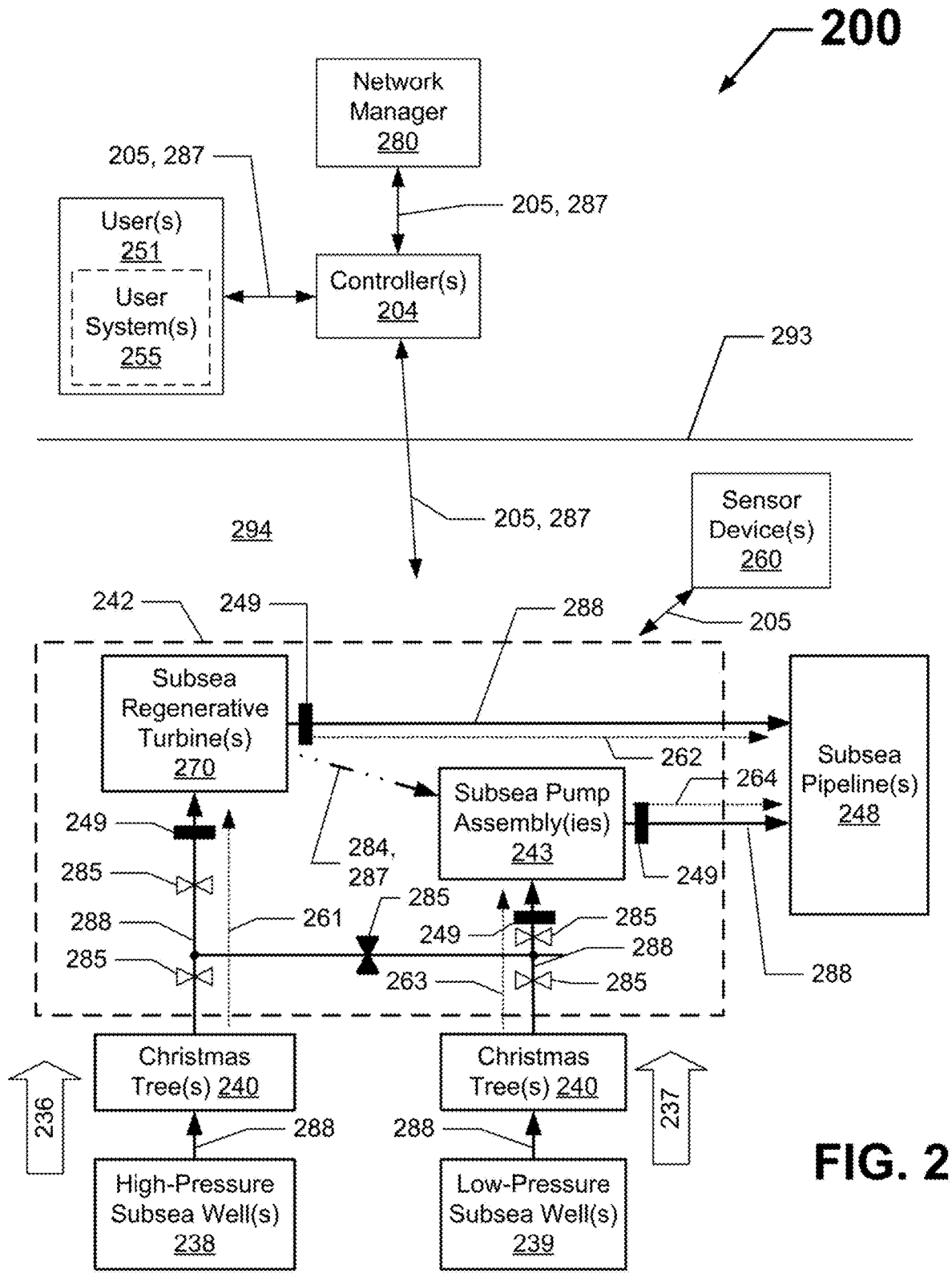
FIG. 2 shows a block diagram of a system for utilizing high pressure subsea reservoir energy to support low-pressure subsea production wells according to certain example embodiments.

FIG. 2 shows a block diagram of a system 200 for utilizing high pressure subsea reservoir energy to support low-pressure subsea production wells according to certain example embodiments. Referring to FIGS. 1 and 2, the system 200 of FIG. 2 includes one or more high-pressure subsea wells 238, one or more low-pressure subsea wells 239, multiple subsea Christmas trees 240, a subsea manifold 242, one or more subsea regenerative turbines 270, one or more subsea pump assemblies 243, one or more subsea pipelines 248, one or more controllers 204, one or more sensor devices 260, one or more users 251 (including one or more optional user systems 255), a network manager 280, piping 288, and multiple valves 285. The subsea Christmas trees 240, the subsea manifold 242, the one or more subsea pipelines 248, and the piping 288 can be substantially the same as the subsea Christmas tree 140, the subsea manifold 142, the one or more subsea pipelines 148, and the piping 188 discussed above with respect to FIG. 1.

The components shown in FIG. 2 are not exhaustive, and in some embodiments, one or more of the components shown in FIG. 2 may not be included in the example system 200. Any component of the system 200 can be discrete or combined with one or more other components of the system 200. Also, one or more components of the system 200 can have different configurations. For example, one or more sensor devices 260 can be disposed above the water line 293 rather than all being submerged in the water 294. As yet another example, one or more sensor devices 260 can be used to measure one or more parameters associated with a subsea pipeline 248 and/or one or more Christmas trees 240. As still another example, a controller 204, rather than being a stand-alone device, can be part of one or more other components (e.g., a subsea regenerative turbine 270, the subsea manifold 242, a subsea Christmas tree 240) of the system 200.

In some cases, the users 251 (including the associated user systems 255), the controllers 204, and the network manager 280 can be located on the topsides (e.g., topsides 107) of a floating structure (e.g., floating structure 103) or a land-based structure (e.g., land-based structure 103). In addition, or in the alternative, one or more users 251 (including any associated user system 255), one or more controllers 204, and/or the network manager 280 can be located elsewhere (e.g., on land, in the water 294).

A user 251 can be any person that interacts, directly or indirectly, with a controller 204 and/or any other component of the system 200. Examples of a user 251 may include, but are not limited to, a business owner, an engineer, a company representative, a geologist, a consultant, a contractor, and a manufacturer's representative. A user 251 can use one or more user systems 255, which may include a display (e.g., a GUI). A user system 255 of a user 251 can interact with (e.g., send data to, obtain data from) the controller 204 via an application interface and using the communication links 205. The user 251 can also interact directly with the controller 204 through a user interface (e.g., keyboard, mouse, touchscreen).

A user system 255 of a user 251 interacts with (e.g., sends data to, receives data from) the controller 204 via an application interface (discussed below with respect to FIG. 3). Examples of a user system 255 can include, but are not limited to, a cell phone with an app, a laptop computer, a handheld device, a smart watch, a desktop computer, and an electronic tablet. In some cases, a user 251 (including an associated user system 255) can also interact with a network manager 280 and/or one or more of the sensor devices 260 in the system 200 using one or more communication links 205.

The network manager 280 is a device or component that controls all or a portion (e.g., a communication network, the controller 204) of the system 200. The network manager 280 can be substantially similar to the controller 204, discussed below. For example, the network manager 280 can include a controller that has one or more components and/or similar functionality to some or all of the controller 204. Alternatively, the network manager 280 can include one or more of a number of features in addition to, or altered from, the features of the controller 204. As described herein, control and/or communication with the network manager 280 can include communicating with one or more other components of the same system 200 or another system. In such a case, the network manager 280 can facilitate such control and/or communication. The network manager 280 can be called by other names, including but not limited to a master controller, a network controller, and an enterprise manager. The network manager 280 can be considered a type of computer device, as discussed below with respect to FIG. 4.

The system 200 can include one or more controllers 204. A controller 204 of the system 200 communicates with and in some cases controls one or more of the other components (e.g., a sensor device 260, an operator for a valve 285, a subsea regenerative turbine 270, a subsea pump assembly 243) of the system 200. A controller 204 performs a number of functions that include obtaining and sending data, evaluating data, following protocols, running algorithms, and sending commands. A controller 204 can include one or more of a number of components. As discussed below with respect to FIG. 3, such components of a controller 204 can include, but are not limited to, a control engine, a communication module, a timer, a counter, a power module, a storage repository, a hardware processor, memory, a transceiver, an application interface, and a security module. When there are multiple controllers 204 (e.g., one controller 204 for the subsea manifold 242, another controller 204 for the subsea regenerative turbine 270, yet another controller 204 for each subsea Christmas tree 240), each controller 204 can operate independently of each other. Alternatively, one or more of the controllers 204 can work cooperatively with each other. As yet another alternative, one of the controllers 204 can control some or all of one or more other controllers 204 in the system 200. Each controller 204 can be considered a type of computer device, as discussed below with respect to FIG. 4.

Each sensor device 260 includes one or more sensors that measure one or more parameters (e.g., pressure, flow rate, temperature, humidity, fluid content, voltage, current, chemical elements in a fluid, chemical elements in a solid). Examples of a sensor of a sensor device 260 can include, but are not limited to, a temperature sensor, a flow sensor, a pressure sensor, a gas spectrometer, a voltmeter, an ammeter, a permeability meter, a porosimeter, and a camera. A sensor device 260 can be integrated with or measure a parameter associated with one or more components of the system 200. For example, a sensor device 260 can be configured to measure a parameter (e.g., flow rate, pressure, temperature) of a subterranean resource (e.g., subterranean resource 111) received by a Christmas tree 240.

As another example, a sensor device 260 can be configured to determine how open or closed a valve 285 within the system 200 is. In some cases, a number of sensor devices 260, each measuring a different parameter, can be used in combination to determine and confirm whether a controller 204 should take a particular action (e.g., operate a valve 285, operate or adjust the operation of a subsea regenerative turbine 270, operate or adjust the operation of a subsea pump assembly 243). When a sensor device 260 includes its own controller (e.g., controller 204), or portions thereof, then the sensor device 260 can be considered a type of computer device, as discussed below with respect to FIG. 4.

The system 200 can include one or more subsea pump assemblies 243. Each subsea pump assembly 243 is located in the water 294 and operates using power generated by a subsea regenerative turbine 270 and delivered using one or more power transfer links 287 and/or a mechanical link 284. A subsea pump assembly 243 can be any device or component that uses energy (e.g., electrical power, rotational energy, hydraulic pressure) that can be provided by a subsea regenerative turbine 270 to operate.

A high-pressure subsea well 238 has extracted therefrom a high-pressure fluid 236 (e.g., a subterranean resource 111). In some cases, the high-pressure fluid 236 can have a pressure, when reaching the piping 288 to the subsea manifold 242, that exceeds a range of operational delivery pressure values. In other words, the pressure of the high-pressure fluid 236 can be in excess of what can be safely handled by the piping 288 and/or other components of the system 200 without potentially damaging or shortening the useful life of the piping 288 and/or other components of the system 200. This can occur for any of a number of reasons, including but not limited to when erosional limits of a system are reached and when the integrity of a downhole completions system is compromised, as where excessive differential pressure collapses or damages some or all of a completions system.

As such, at least some of the excessive pressure of the high-pressure fluid 225 can be used by a subsea regenerative turbine 270 to generate energy while putting the resulting pressure of the high-pressure fluid 225 within a range of operational delivery pressure values, which can safely flow through the piping 288 and/or other components of the system 200 without causing damage to one or more downstream components of the system 200. The energy generated by the subsea regenerative turbine 270 can be used to raise the pressure of a low-pressure fluid 237 from a low-pressure well 239 to overcome the system pressure (e.g., due to back pressure from a riser column, due to frictional losses, etc.) downstream of the low-pressure well 239.

The pressure value of the high-pressure fluid 236 flowing through some point (e.g., entering the subsea Christmas tree 240, entering the subsea manifold 242) in the system 200 can be a parameter measured by a sensor device 260. A controller 204 in communication (using communication links 205) with the sensor device 260 can receive and interpret the measured pressure value of the high-pressure fluid 236. In this way, a controller 204 can identify the pressure of the high-pressure fluid 236 and determine whether the pressure is excessive (above the range of operational delivery pressure values) to be sent to the subsea pipelines 248, deficient (below a range of operational delivery pressure values) to send to the subsea pipelines 248, or sufficient (within the range of operational delivery pressure values) to send to the subsea pipelines 248. The following table provides an example of how these different categorizations of pressure are quantified.

TABLE 1

| Categorization | Pressure Values (psi) | Applies to |
| --- | --- | --- |
| Excessive Pressure | Greater than 2100 | High-Pressure Fluid 236 |
| Operational Delivery Pressure Values | 1000-2100 | High-Pressure Fluid 236, Low-Pressure Fluid 237 |
| Deficient Pressure | Less than 1000 | Low-Pressure Fluid 237 |

The values in Table 1 below can vary based on one or more of a number of factors for a given system. Such factors can include, but are not limited to, the nameplate information (e.g., pressure rating, size) of the various equipment (e.g., piping 288, valves 285, subsea pipelines 248, condensers, evaporators) in the system, the depth (e.g., total vertical depth) of a high-pressure subsea well 238, the temperature of the water 294 at the seabed, the type (e.g., oil, natural gas) of subterranean resource included in the high-pressure fluid 236, other components or elements included in the high-pressure fluid 236, and the proximity of the various wells to each other. The range of operational delivery pressure values can further be determined by one or more additional factors, including but not limited to the frictional losses of the fluid flowing through the piping 288, the head loss that must be overcome by the fluid, and onboarding pressure.

Excessive pressure of a high-pressure fluid 236 can result from one or more of a number of processes. For example, excessive pressure of a high-pressure fluid 236 can be naturally-occurring from the subterranean formation (e.g., subterranean formation 110) that the high-pressure subsea well 238 traverses. However excessive pressure of a high-pressure fluid 236 results, when the pressure of the high-pressure fluid 236 is excessive (e.g., exceeds the range of operational delivery pressure values as measured by a sensor device 260 and determined by a controller 204) when reaching the subsea Christmas tree 240 associated with the high-pressure subsea well 238, the pressure should be reduced by some amount in order for the piping 288 and other components of the system 200 to safely and reliably transport the high-pressure fluid 236 to the subsea pipelines 248.

To accomplish this, a component (e.g., a valve 285 in the form of a choke) of the subsea Christmas tree 240 (or some other part of the subsea system 200) can be used to reduce the pressure of the high-pressure fluid 236 to reduce the pressure of the high-pressure fluid 236, in some cases recategorizing the high-pressure fluid 236 from having an excessive pressure to falling within a range of operational delivery pressure values. Additionally, or alternatively, the excessive pressure of the high-pressure fluid 236 being reduced by having the high-pressure fluid 236 flow through a subsea regenerative turbine 270. The range of operational delivery pressure values can coincide with the operational range of pressures for a subsea regenerative turbine 270 through which a high-pressure fluid 236 flows.

When the high-pressure fluid 236 is within the range of operational delivery pressure values (e.g., as determined by a controller 204 based on measurements made by one or more sensor devices 260), then the high-pressure fluid 236 can follow a flow path 261 through the piping 288 in the subsea manifold 242 to the subsea pipelines 248. The flow path 261 can be established by operating (e.g., closing, opening) one or more valves 285 so that the flow path 261 is the only route in the piping 288 through which the high-pressure fluid 236 can flow from the subsea Christmas tree 240. As the high-pressure fluid 236 flows through the subsea regenerative turbine 270, some of its pressure is converted to energy that can be used, by way of a mechanical link 284 or power transfer link 287, to operate one or more of the subsea pump assemblies 243.

When the high-pressure fluid 236 with excessive pressure leaves the subsea regenerative turbine 270, the resulting loss in pressure can recategorize the high-pressure fluid 236 as being within the range of operational delivery pressure values. In other words, the high-pressure fluid 236 has a pressure that is sufficiently high so that the high-pressure fluid 236 flows through piping 288 along flow path 262 toward the subsea pipelines 248 without assistance (e.g., pumping from a pump). Flow path 262 can be established (e.g., manually by a user 251, automatically by a controller 204) by configuring (e.g., closing, opening) one or more valves 285 integrated with the piping 288 between the subsea regenerative turbine 270 and the subsea pipelines 248.

In some cases, a high-pressure fluid 236 can have a pressure that is within the range of operational delivery pressure values without being choked down or processed through a subsea regenerative turbine 270. In such a case, the high-pressure fluid 236 has enough pressure to reach the subsea pipelines 248, but only if the high-pressure fluid 236 avoids flowing through a choke or a subsea regenerative turbine 270, thereby avoiding the loss of more pressure.

When these cases occur, one or more valves can be configured (e.g., opened, closed), whether manually (e.g., by a user 251) or automatically (e.g., by a controller), so that the flow path of the high-pressure fluid 236 through the piping of the subsea manifold 242 avoids the subsea regenerative turbines 270.

A low-pressure subsea well 239 has extracted therefrom a low-pressure fluid 237 (e.g., a subterranean resource 111). A low-pressure fluid 237 has a pressure, when reaching the piping 288 to the subsea manifold 242, that either falls within a range of operational delivery pressure values or is deficient. When the pressure of a low-pressure fluid 237 is within the range of operational delivery pressure values, the low-pressure fluid 237 can flow through the piping 288 in the subsea manifold 242 to the subsea pipelines 248 with little or no assistance, as from a subsea pump assembly 243. When the pressure of a low-pressure fluid 237 is deficient (falls below the range of operational delivery pressure values), the low-pressure fluid 237 needs to receive additional assistance (e.g., as from a subsea pump assembly 243) in order to flow through the piping 288 in the subsea manifold 242 to reach the subsea pipelines 248. Without this additional assistance, the low-pressure fluid 237 from a low-pressure subsea well 239 cannot be recovered and produced.

The pressure value of the low-pressure fluid 237 flowing through some point (e.g., entering the subsea Christmas tree 240, entering the subsea manifold 242) in the system 200 can be a parameter measured by a sensor device 260. A controller 204 in communication (using communication links 205) with the sensor device 260 can receive and interpret the measured pressure value of the low-pressure fluid 237. In this way, a controller 204 can identify the pressure of the low-pressure fluid 237 and determine whether the pressure is deficient (below the range of operational delivery pressure values) or within the range of operational delivery pressure values.

The low pressure of a low-pressure fluid 237 can result from one or more of a number of processes. For example, the low pressure of a low-pressure fluid 237 can be naturally-occurring from the subterranean formation (e.g., subterranean formation 110) that a low-pressure subsea well 238 traverses. Specifically, a low-pressure subsea well 239 is initially a high-pressure subsea well 238 when the well begins production. Over time, as more of the subterranean resource is produced from the well, the pressure of the well naturally drops. When the pressure drops (e.g., as measured by a sensor device 260 and determined by a controller 204) to below the range of operational delivery pressure values out of the well, then the high-pressure subsea well 238 is recategorized as a low-pressure subsea well 239. When the well is recategorized, one or more valves 285 can be operated (e.g., manually by a user 251, automatically by a controller 204) to change the flow path (e.g., from flow path 261 to another flow path) of the now low-pressure fluid 237 through the piping 288 in the subsea manifold 242.

When the low-pressure fluid 237 falls below the range of operational delivery pressure values (e.g., as determined by a controller 204 based on measurements made by one or more sensor devices 260), the pressure becomes deficient and needs to be boosted in order for the low-pressure subsea well 239 to continue producing. To accomplish this, the low-pressure fluid 237, assisted by a subsea pump assembly 243, can follow a flow path 263 through the piping 288 in the subsea manifold 242 to a subsea pump assembly 243. The flow path 263 can be established by operating (e.g., closing, opening) one or more valves 285 so that the flow path 263 is the only route in the piping 288 through which the low-pressure fluid 237 can flow from the subsea Christmas tree 240.

As the low-pressure fluid 237 flows along the flow path 263 and through piping 288 to the subsea pump assembly 243, the pressure of the low-pressure fluid 237 is increased to within the range of operational delivery pressure values, allowing the low-pressure fluid 237 to be produced by flowing beyond the subsea pump assembly 243 through more piping 288 to the subsea pipelines 248, which is defined by flow path 264. Flow path 264 can be established (e.g., manually by a user 251, automatically by a controller 204) by configuring (e.g., closing, opening) one or more valves 285 integrated with the piping 288 between the subsea pump assembly 243 and the subsea pipelines 248.

There can be one or more reservoirs within the subterranean formation (e.g., subterranean formation 110), where each reservoir includes one or more subterranean resources (e.g., subterranean resources 111). The high-pressure fluids 236 and the low-pressure fluids 237 that are extracted through the high-pressure subsea wells 238 and the low-pressure subsea wells 239, respectively, may or may not be part of the same connected reservoir.

The subsea manifold 242 can include one or more subsea regenerative turbines 270 and/or one or more subsea pump assemblies 243. In other words, one or more subsea regenerative turbines 270 (or portions thereof) and/or one or more subsea pump assemblies 243 (or portions thereof) can be integrated with the piping 288 and valves 285 of the subsea manifold 242. In certain example embodiments, a subsea regenerative turbine 270 has multiple components and/or configurations. At least some, if not all, of these components of a subsea regenerative turbine 270 are located in the water 294. Examples of components of a subsea regenerative turbine 270 can include, but are not limited to, a shaft, a turbine, an adjustable speed drive, and a generator. While this example shows that each subsea regenerative turbine 270 is integrated with the subsea manifold 242, in alternative embodiments one or more subsea regenerative turbines 270 can be a stand-alone component of the system 200 or integrated with another subsea component (e.g., a Christmas tree 240) of the system 200.

A subsea regenerative turbine 270 is designed to receive a high-pressure fluid 236 (e.g., the subterranean resource 111) from one or more high-pressure subsea wells 238. A subsea regenerative turbine 270 can include one or more of a number of components. Examples of such components can include, but are not limited to, a turbine, a shaft, an adjustable speed drive, and a housing. The high-pressure fluid 236 can flow through the regenerative turbine 270 to generate energy (e.g., electrical power if the subsea regenerative turbine 270 includes a generator, rotational energy if the subsea regenerative turbine 270 includes a shaft that is coupled to a subsea pump assembly 243) that can be used to run the subsea pump assembly 243. To the extent that a component of a subsea regenerative turbine 270 is located in the water 294, the component can be contained within a housing that is designed for a subsea environment. Various examples of a subsea regenerative turbine 270 are discussed below with respect to FIGS. 5A through 7.

A subsea pump assembly 243 is configured to circulate a fluid (e.g., a low-pressure fluid 237) through the piping 288 within the subsea manifold 242 to the subsea pipelines 248. Each subsea pump assembly 243 can include one or more of a number of components. Examples of such components can include, but are not limited to, a pump, a motor, a shaft, a gear, an adjustable speed drive, and a housing. Each subsea pump assembly 243 can be integrated with the piping 288 of the subsea manifold 242, as shown in FIG. 2. In alternative embodiments, a subsea pump assembly 243 can be integrated with another subsea component of the system 200 or can be a stand-alone subsea component of the system 200.

In certain example embodiments, each subsea pump assembly 243 is configured to pump a low-pressure fluid 237 through the piping 288 to the subsea pipelines 248. As discussed above, more specifically, a subsea pump assembly 243 boosts the pressure of the low-pressure fluid 237 from being deficient to being within the range of operational delivery pressure values so that the low-pressure fluid 237 can flow along flow path 263 through piping 288 from the subsea Christmas tree 240 to the subsea pump assembly 243 and further along flow path 264 through piping 288 from the subsea pump assembly 243 to the subsea pipelines 248. In certain example embodiments, each subsea pump assembly 243 operates, at least in part, using energy provided by one or more subsea regenerative turbines 270.

In certain example embodiments, a subsea regenerative turbine 270 and/or a subsea pump assembly 243 can be isolated from the rest of the system 200 and/or bypassed while a field operation (or stage thereof) remains ongoing, without being interrupted. In such a case, one or more valves 285 can be integrated with the piping 288 leading to, leading from, and/or bypassing a subsea regenerative turbine 270 and/or a subsea pump assembly 243 in order to accomplish these adjustments to the utilization of the subsea regenerative turbine 270 and/or the subsea pump assembly 243 in real time. Each of these valves 288 can be operated manually (e.g., by a user 251) or remotely (e.g., using a controller 204).

In addition, or in the alternative, a subsea regenerative turbine 270 and/or a subsea pump assembly 243 can be inserted into and/or removed from the piping 288 in the subsea manifold 242 (or other part of the system 200) using one or more disconnects 249. Each disconnect 249 is designed to allow for the associated piping 288 to be sealed (closed) when a subsea regenerative turbine 270 and/or a subsea pump assembly 243 is removed from the system 200 and open when a subsea regenerative turbine 270 and/or a subsea pump assembly 243 is connected to the system 200. A disconnect 249 can be operated manually (e.g., by a user 251) or remotely (e.g., using a controller 204). Such disconnects 249 can be used in conjunction with, or independently of, one or more of the valves 285. If a subsea regenerative turbine 270 is removed (e.g., as when a high-pressure fluid 236 is recategorized from having an excessive pressure to being within the range of operational delivery pressure values), flow path 261 and flow path 262 can be combined into a single flow path. Similarly, if a subsea pump assembly 243 is removed, flow path 263 and flow path 264 can be combined into a single flow path.

A valve 285 can have one or more of any of a number of configurations, including but not limited to a choke valve, a guillotine valve, a check valve, a ball valve, a gate valve, a butterfly valve, a pinch valve, a needle valve, a plug valve, a diaphragm valve, and a globe valve. One valve 285 can be configured the same as or differently compared to another valve 285 in the system 200. If a valve 285 is controllable, that valve 285 can be controlled by a user 251, a controller 204, or some other component of the system 200. When there are multiple valves 285 in the system 200 that are controllable, one valve 285 can be controlled (e.g., manually by a user 251, automatically by a controller 204) the same or differently compared to how another valve 285 in the system 200 is controlled. When a valve 285 is described herein as being in a closed position or being closed, the valve 285 is fully closed, which prevents any fluid from flowing therethrough. When a valve 285 is described herein as being in an open position or being open, the valve 285 can be fully open or partially (e.g., 25%, 50%) open. As a result, when a valve 285 is in an open position or is open, some amount of fluid flows therethrough.

Communication between the network manager 280, the users 251 (including any associated user systems 255), the controllers 204, the subsea Christmas trees 240, the subsea manifold 242, the subsea regenerative turbines 270, the sensor devices 260, the subsea pipelines 248, the subsea pump assemblies 243, and any other components of the system 200 can be facilitated using the communication links 205, which are substantially the same as the communication links 105 discussed above with respect to FIG. 1. Similarly, the transfer of power between any two components (e.g., a subsea regenerative turbine 270 and a subsea pump assembly 243, a power generator on the topsides (e.g., topsides 107) of a floating structure (e.g., floating structure 103) or a land-based structure (e.g., land-based structure 103) and a controller 204) can be facilitated using power transfer links 287, which are substantially the same as the power transfer links 187 discussed above with respect to FIG. 1.

Figure 3:
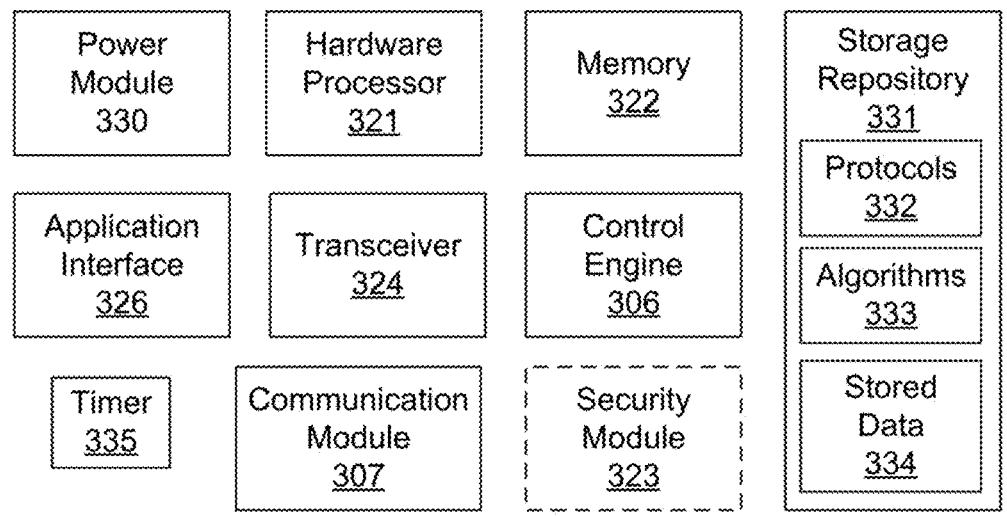
FIG. 3 shows a block diagram of a controller of the system of FIG. 2.

FIG. 3 shows a system diagram of a controller 204 of the system 200 of FIG. 2. Referring to FIGS. 1 through 3, the controller 204 of FIG. 3 can include multiple components. In this case, the controller 204 of FIG. 3 includes a control engine 306, a communication module 307, a timer 335, a power module 330, a storage repository 331, a hardware processor 321, a memory 322, a transceiver 324, an application interface 326, and, optionally, a security module 323. The controller 204 (or components thereof) can be located at or near the various components of the system 200. In addition, or in the alternative, the controller 204 (or components thereof) can be located remotely from (e.g., in the cloud, at an office building) the various components of a system.

The storage repository 331 can be a persistent storage device (or set of devices) that stores software and data used to assist the controller 204 in communicating with one or more other components of a system, such as the users 251 (including associated user systems 255), the subsea Christmas trees 240, the subsea manifold 242, the subsea regenerative turbines 270, the subsea pump assemblies 243, the subsea pipelines 248, the network manager 280, and the sensor devices 260 of the system 200 of FIG. 2. In one or more example embodiments, the storage repository 331 stores one or more protocols 332, algorithms 333, and stored data 334.

The protocols 332 of the storage repository 331 can be any procedures (e.g., a series of method steps) and/or other similar operational processes that the control engine 306 of the controller 204 follows based on certain conditions at a point in time. The protocols 332 can include any of a number of communication protocols that are used to send and/or obtain data between the controller 204 and other components of the system 200. Such protocols 332 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 332 can provide a layer of security to the data transferred within the system 200. Other protocols 332 used for communication can be associated with the use of Wi-Fi, Zigbee, visible light communication (VLC), cellular networking, BLE, UWB, and Bluetooth.

The algorithms 333 can be any formulas, mathematical models, forecasts, simulations, and/or other similar tools that the control engine 306 of the controller 204 uses to reach a computational conclusion. For example, one or more algorithms 333 can be used, in conjunction with one or more protocols 332, to assist the controller 204 to determine when to start, adjust, and/or stop the operation of a subsea regenerative turbine 270 (or portion thereof), a subsea pump assembly 243 (or portion thereof), and/or any other subsea component (or portion thereof) of the system 200. As another example, one or more algorithms 333 can be used, in conjunction with one or more protocols 332, to assist the controller 204 to receive measurements made by one or more sensor devices 260 and use those measurements to assess the system 200 (or components thereof) in real time.

Stored data 334 can be any data associated with a field (e.g., the subterranean formation 110, the subterranean resource 111, the wellbore 120), other fields (e.g., other wellbores and subterranean formations), the other components (e.g., the user systems 255, the subsea manifold 242, the subsea pump assemblies 243, the subsea regenerative turbines 270), including associated equipment (e.g., motors, pumps, compressors), of the system 200, measurements made by the sensor devices 260, threshold values, tables, results of previously run or calculated algorithms 333, updates to protocols 332, user preferences, and/or any other suitable data. Such data can be any type of data, including but not limited to historical data, present data, and future data (e.g., forecasts). The stored data 334 can be associated with some measurement of time derived, for example, from the timer 335.

Examples of a storage repository 331 can include, but are not limited to, a database (or a number of databases), a file system, cloud-based storage, a hard drive, flash memory, some other form of solid-state data storage, or any suitable combination thereof. The storage repository 331 can be located on multiple physical machines, each storing all or a portion of the communication protocols 332, the algorithms 333, and/or the stored data 334 according to some example embodiments. Each storage unit or device can be physically located in the same or in a different geographic location.

The storage repository 331 can be operatively connected to the control engine 306. In one or more example embodiments, the control engine 306 includes functionality to communicate with the users 251 (including associated user systems 255), the sensor devices 260, the network manager 280, and the other components in the system 200. More specifically, the control engine 306 sends information to and/or obtains information from the storage repository 331 in order to communicate with the users 251 (including associated user systems 255), the sensor devices 260, the network manager 280, and the other components of the system 200. As discussed below, the storage repository 331 can also be operatively connected to the communication module 307 in certain example embodiments.

In certain example embodiments, the control engine 306 of the controller 204 controls the operation of one or more components (e.g., the communication module 307, the timer 335, the transceiver 324) of the controller 204. For example, the control engine 306 can activate the communication module 307 when the communication module 307 is in "sleep" mode and when the communication module 307 is needed to send data obtained from another component (e.g., a sensor device 260) in the system 200. In addition, the control engine 306 of the controller 204 can control the operation of one or more other components (e.g., a subsea regenerative turbine 270, the subsea manifold 242, a subsea pump 275), or portions thereof, of the system 200.

The control engine 306 of the controller 204 can communicate with one or more other components of the system 200. For example, the control engine 306 can use one or more protocols 332 to facilitate communication with the sensor devices 260 to obtain data (e.g., measurements of various parameters, such as temperature, pressure, and flow rate), whether in real time or on a periodic basis and/or to instruct a sensor device 260 to take a measurement. The control engine 306 can use measurements of parameters taken by sensor devices 260 during a stage of a field operation, as well as one or more protocols 332 and/or algorithms 333, to determine whether the operation of a subsea regenerative turbine 270 (or portion thereof), a subsea pump assembly 243 (or portion thereof), and/or any other subsea component (or portion thereof) of the system 200 needs to be started, stopped, or adjusted. Such a determination can be made in real time or on a periodic (e.g., every 30 seconds) basis.

The control engine 306 can generate and process data associated with control, communication, and/or other signals sent to and obtained from the users 251 (including associated user systems 255), the sensor devices 260, the network manager 280, and the other components of the system 200. In certain embodiments, the control engine 306 of the controller 204 can communicate with one or more components of a system external to the system 200. For example, the control engine 306 can interact with an inventory management system by ordering replacements for components or pieces of equipment (e.g., a sensor device 260, a valve 285, a motor) within the system 200 that has failed or is failing. As another example, the control engine 306 can interact with a contractor or workforce scheduling system by arranging for the labor needed to replace a component or piece of equipment in the system 200. In this way and in other ways, the controller 204 is capable of performing a number of functions beyond what could reasonably be considered a routine task.

In certain example embodiments, the control engine 306 can include an interface that enables the control engine 306 to communicate with the sensor devices 260, the user systems 255, the network manager 280, and the other components of the system 200. For example, if a user system 255 operates under IEC Standard 62386, then the user system 255 can have a serial communication interface that will transfer data to the controller 204. Such an interface can operate in conjunction with, or independently of, the protocols 332 used to communicate between the controller 204 and the users 251 (including corresponding user systems 255), the sensor devices 260, the network manager 280, and the other components of the system 200.

The control engine 306 (or other components of the controller 204) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 307 of the controller 204 determines and implements the communication protocol (e.g., from the protocols 332 of the storage repository 331) that is used when the control engine 306 communicates with (e.g., sends signals to, obtains signals from) the user systems 255, the sensor devices 260, the network manager 280, and the other components of the system 200. In some cases, the communication module 307 accesses the stored data 334 to determine which communication protocol is used to communicate with another component of the system 200. In addition, the communication module 307 can identify and/or interpret the communication protocol of a communication obtained by the controller 204 so that the control engine 306 can interpret the communication. The communication module 307 can also provide one or more of a number of other services with respect to data sent from and obtained by the controller 204. Such services can include, but are not limited to, data packet routing information and procedures to follow in the event of data interruption.

The timer 335 of the controller 204 can track clock time, intervals of time, an amount of time, and/or any other measure of time. The timer 335 can also count the number of occurrences of an event, whether with or without respect to time. Alternatively, the control engine 306 can perform a counting function. The timer 335 is able to track multiple time measurements and/or count multiple occurrences concurrently. The timer 335 can track time periods based on an instruction obtained from the control engine 306, based on an instruction obtained from a user 251, based on an instruction programmed in the software for the controller 204, based on some other condition (e.g., the occurrence of an event) or from some other component, or from any combination thereof. In certain example embodiments, the timer 335 can provide a time stamp for each packet of data obtained from another component (e.g., a sensor device 260) of the system 200.

The power module 330 of the controller 204 obtains power from a power supply (e.g., AC mains) and manipulates (e.g., transforms, rectifies, inverts) that power to provide the manipulated power to one or more other components (e.g., the timer 335, the control engine 306) of the controller 204, where the manipulated power is of a type (e.g., alternating current, direct current) and level (e.g., 12V, 24V, 120V) that can be used by the other components of the controller 204. In some cases, the power module 330 can also provide power to one or more of the sensor devices 260.

The power module 330 can include one or more of a number of single or multiple discrete components (e.g., transistor, diode, resistor, transformer) and/or a microprocessor. The power module 330 may include a printed circuit board, upon which the microprocessor and/or one or more discrete components are positioned. In addition, or in the alternative, the power module 330 can be a source of power in itself to provide signals to the other components of the controller 204. For example, the power module 330 can be or include an energy storage device (e.g., a battery). As another example, the power module 330 can be or include a localized photovoltaic power system.

The hardware processor 321 of the controller 204 executes software, algorithms (e.g., algorithms 333), and firmware in accordance with one or more example embodiments. Specifically, the hardware processor 321 can execute software on the control engine 306 or any other portion of the controller 204, as well as software used by the users 251 (including associated user systems 255), the network manager 280, and/or other components of the system 200. The hardware processor 321 can be an integrated circuit, a central processing unit, a multi-core processing chip, SoC, a multi-chip module including multiple multi-core processing chips, or other hardware processor in one or more example embodiments. The hardware processor 321 can be known by other names, including but not limited to a computer processor, a microprocessor, and a multi-core processor.

In one or more example embodiments, the hardware processor 321 executes software instructions stored in memory 322. The memory 322 includes one or more cache memories, main memory, and/or any other suitable type of memory. The memory 322 can include volatile and/or non-volatile memory. The memory 322 can be discretely located within the controller 204 relative to the hardware processor 321. In certain configurations, the memory 322 can be integrated with the hardware processor 321.

In certain example embodiments, the controller 204 does not include a hardware processor 321. In such a case, the controller 204 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 204 (or portions thereof) to be programmable and function according to certain logic rules and thresholds without the use of a hardware processor. Alternatively, FPGAs, IGBTs, ICs, and/or similar devices can be used in conjunction with one or more hardware processors 321.

The transceiver 324 of the controller 204 can send and/or obtain control and/or communication signals. Specifically, the transceiver 324 can be used to transfer data between the controller 204 and the users 251 (including associated user systems 255), the sensor devices 260, the network manager 280, and the other components of the system 200. The transceiver 324 can use wired and/or wireless technology. The transceiver 324 can be configured in such a way that the control and/or communication signals sent and/or obtained by the transceiver 324 can be obtained and/or sent by another transceiver that is part of a user system 255, a sensor device 260, the network manager 280, and/or another component of the system 200. The transceiver 324 can send and/or obtain any of a number of signal types, including but not limited to radio frequency signals and sound waves.

When the transceiver 324 uses wireless technology, any type of wireless technology can be used by the transceiver 324 in sending and obtaining signals. Such wireless technology can include, but is not limited to, Wi-Fi, Zigbee, VLC, cellular networking, BLE, UWB, and Bluetooth. The transceiver 324 can use one or more of any number of suitable communication protocols (e.g., ISA100, HART) when sending and/or obtaining signals.

Optionally, in one or more example embodiments, the security module 323 secures interactions between the controller 204, the users 251 (including associated user systems 255), the sensor devices 260, the network manager 280, and the other components of the system 200. More specifically, the security module 323 authenticates communication from software based on security keys verifying the identity of the source of the communication. For example, user software may be associated with a security key enabling the software of a user system 255 to interact with the controller 204. Further, the security module 323 can restrict receipt of information, requests for information, and/or access to information.

A user 251 (including an associated user system 255), the sensor devices 260, the network manager 280, and the other components of the system 200 can interact with the controller 204 using the application interface 326. Specifically, the application interface 326 of the controller 204 obtains data (e.g., information, communications, instructions, updates to firmware) from and sends data (e.g., information, communications, instructions) to the user systems 255 of the users 251, the sensor devices 260, the network manager 280, and/or the other components of the system 200. Examples of an application interface 326 can be or include, but are not limited to, an application programming interface, a web service, a data protocol adapter, some other hardware and/or software, or any suitable combination thereof. Similarly, the user systems 255 of the users 251, the sensor devices 260, the network manager 280, and/or the other components of the system 200 can include an interface (similar to the application interface 326 of the controller 204) to obtain data from and send data to the controller 204 in certain example embodiments.

In addition, as discussed above with respect to a user system 255 of a user 251, one or more of the sensor devices 260, the network manager 280, and/or one or more of the other components of the system 200 can include a user interface. Examples of such a user interface can include, but are not limited to, a graphical user interface, a touchscreen, a keyboard, a monitor, a mouse, some other hardware, or any suitable combination thereof.

The controller 204, the users 251 (including associated user systems 255), the sensor devices 260, the network manager 280, and the other components of the system 200 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 204. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 4.

Further, as discussed above, such a system can have corresponding software (e.g., user system software, sensor device software, controller software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the overall system (e.g., system 200).

Figure 4:
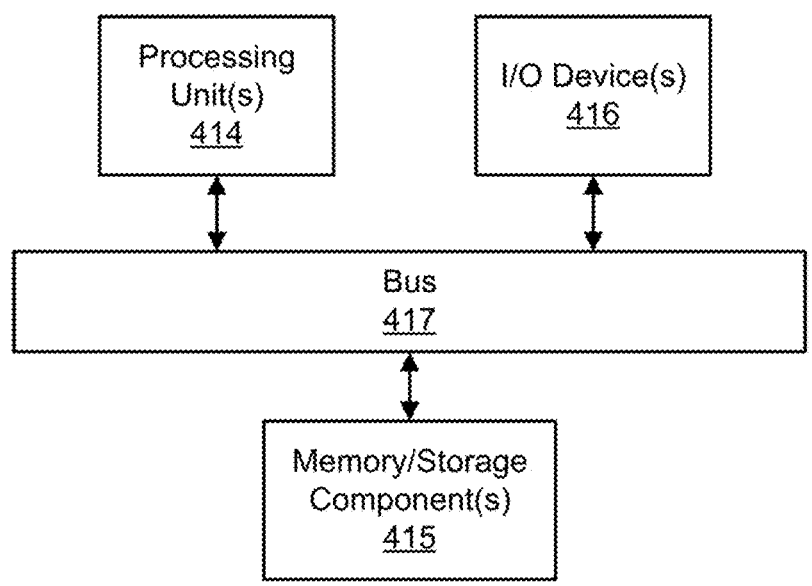
FIG. 4 shows a diagram of a computing system according to certain example embodiments.

FIG. 4 illustrates one embodiment of a computing device 418 that implements one or more of the various techniques described herein, and which is representative, in whole or in part, of the elements described herein pursuant to certain example embodiments. For example, a controller 204 (including components thereof, such as a control engine 306, a hardware processor 320, a storage repository 331, a power module 330, and a transceiver 324) can be considered a computing device 418. Computing device 418 is one example of a computing device and is not intended to suggest any limitation as to scope of use or functionality of the computing device and/or its possible architectures. Neither should the computing device 418 be interpreted as having any dependency or requirement relating to any one or combination of components illustrated in the example computing device 418.

The computing device 418 includes one or more processors or processing units 414, one or more memory/storage components 415, one or more input/output (I/O) devices 416, and a bus 417 that allows the various components and devices to communicate with one another. The bus 417 represents one or more of any of several types of bus structures, including a memory bus or memory controller, a peripheral bus, an accelerated graphics port, and a processor or local bus using any of a variety of bus architectures. The bus 417 includes wired and/or wireless buses.

The memory/storage component 415 represents one or more computer storage media. The memory/storage component 415 includes volatile media (such as random access memory (RAM)) and/or nonvolatile media (such as read only memory (ROM), flash memory, optical disks, magnetic disks, and so forth). The memory/storage component 415 includes fixed media (e.g., RAM, ROM, a fixed hard drive, etc.) as well as removable media (e.g., a Flash memory drive, a removable hard drive, an optical disk, and so forth).

One or more I/O devices 416 allow a user 251 to enter commands and information to the computing device 418, and also allow information to be presented to a user 251 and/or other components or devices. Examples of input devices 416 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 418 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 418 includes at least the minimal processing, input, and/or output means necessary to practice one or more embodiments.

Further, those skilled in the art will appreciate that one or more elements of the aforementioned computer device 418 is located at a remote location and connected to the other elements over a network in certain example embodiments. Further, one or more embodiments is implemented on a distributed system having one or more nodes, where each portion of the implementation (e.g., a subsea regenerative turbine 270, the subsea manifold 242, a subsea pump assembly 243) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 5A:
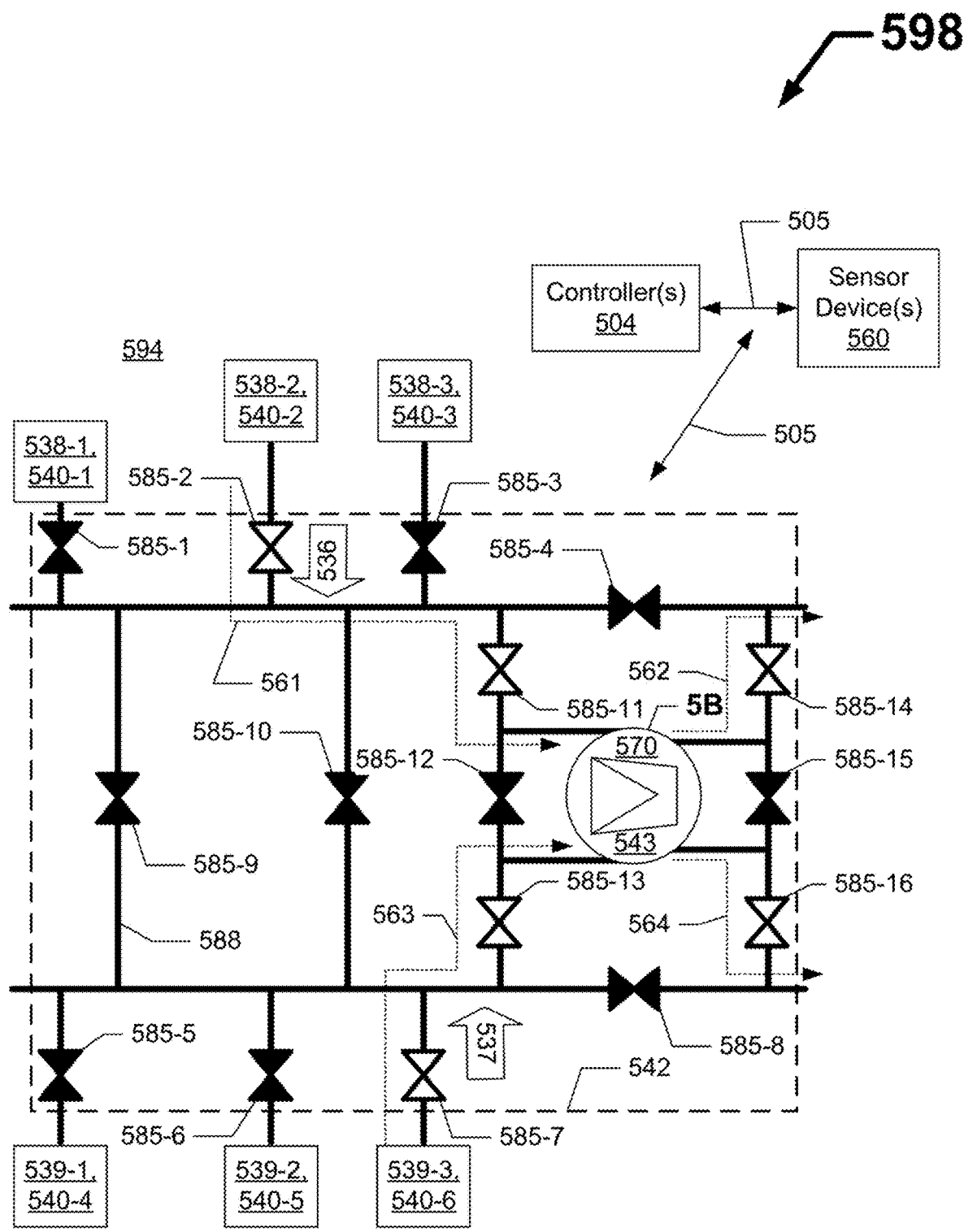
FIGS. 5A and 5B show a subsystem based on the configuration of the system of FIG. 2 for utilizing high pressure subsea reservoir energy to support low-pressure subsea production wells according to certain example embodiments.
Figure 5B:
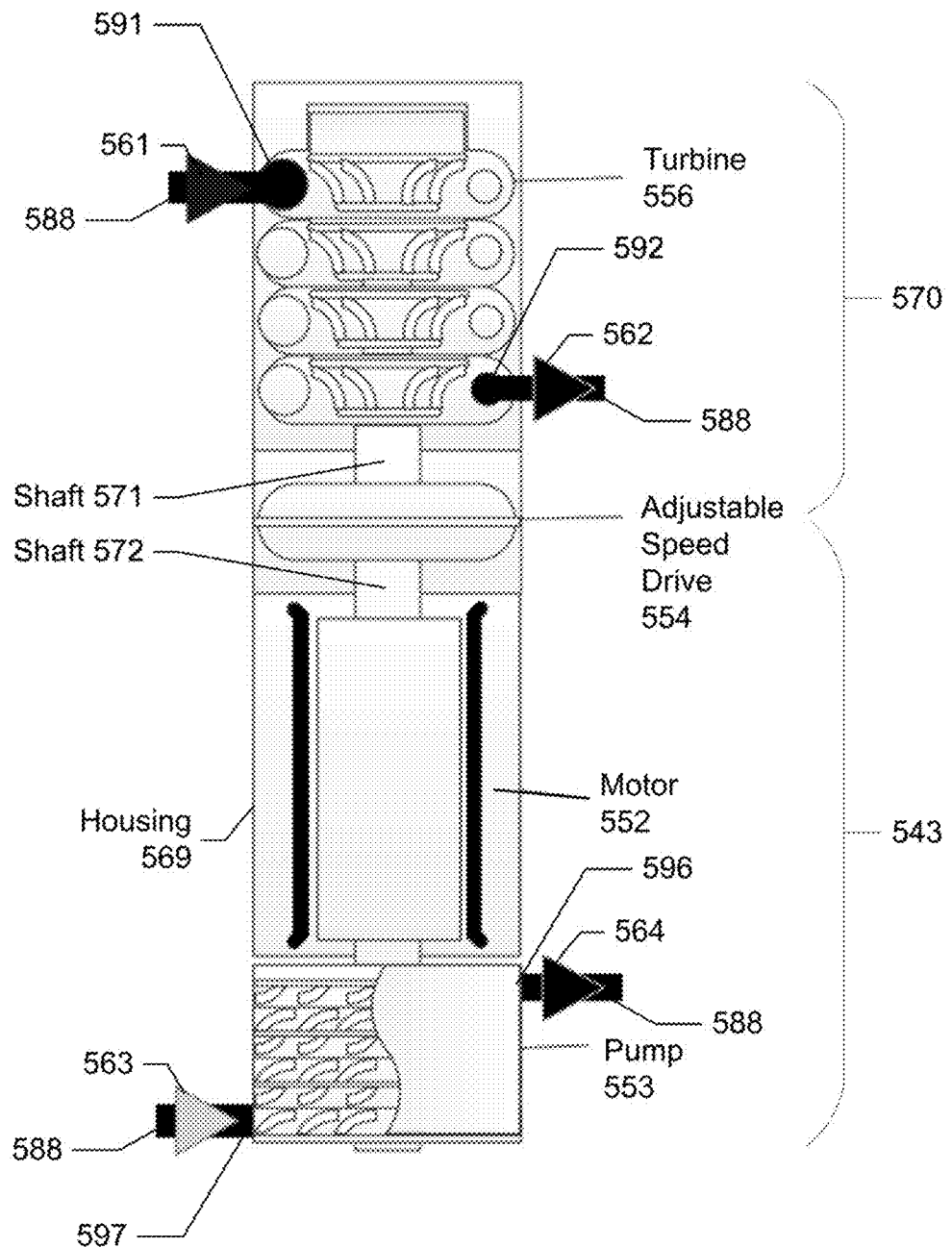

FIGS. 5A and 5B show a subsystem 598 based on the configuration of the system 200 of FIG. 2 for utilizing high pressure subsea reservoir energy to support low-pressure subsea production wells according to certain example embodiments. Specifically, FIG. 5A shows a block diagram of the subsystem 598, and FIG. 5B shows a detailed view of an integrated component that includes the regenerative turbine 570 and the subsea pump assembly 543 of the subsystem 598. Referring to FIGS. 1 through 5B, the subsystem 598 includes a subsea manifold 542, a controller 504, one or more sensor devices 560, a high-pressure fluid 536, a low-pressure fluid 537, three high-pressure subsea wells 538 with associated subsea Christmas trees 540 (high-pressure subsea well 538-1 with subsea Christmas tree 540-1, high-pressure subsea well 538-2 with subsea Christmas tree 540-2, and high-pressure subsea well 538-2 with subsea Christmas tree 540-3), and three low-pressure subsea wells 539 with associated subsea Christmas trees 540 (low-pressure subsea well 539-1 with subsea Christmas tree 540-4, low-pressure subsea well 539-2 with subsea Christmas tree 540-5, and low-pressure subsea well 539-2 with subsea Christmas tree 540-6), all of which are located in water 594.

The subsea manifold 542 includes a subsea regenerative turbine 570, a subsea pump assembly 543, piping 588, and 16 valves 585 (valve 585-1, valve 585-2, valve 585-3, valve 585-4, valve 585-5, valve 585-6, valve 585-7, valve 585-8, valve 585-9, valve 585-10, valve 585-11, valve 585-12, valve 585-13, valve 585-14, valve 585-15, and valve 585-16). The subsea manifold 542, the controller 504, the sensor devices 560, the high-pressure fluid 536, the low-pressure fluid 537, the valves 585, the subsea pump assembly 543, the subsea Christmas trees 540, the high-pressure subsea wells 538, the low-pressure subsea wells 539, the piping 588, and the subsea regenerative turbine 570 can be substantially the same as the subsea manifold 242, the controller 204, the sensor devices 260, the high-pressure fluid 236, the low-pressure fluid 237, the valves 285, the subsea pump assembly 243, the subsea Christmas trees 240, the high-pressure subsea wells 238, the low-pressure subsea wells 239, the piping 288, and the subsea regenerative turbine 270 discussed above with respect to FIG. 2.

As discussed above, the subsea manifold 542 can have any of a number of components and/or configurations. In this case, the subsea manifold 542 has piping 588 and a number of valves 585 that are configured to have a high-pressure fluid flow path 561 that receives high-pressure fluid 536 from one or more high-pressure subsea wells 538 and a low-pressure fluid flow path 563 that receives low-pressure fluid 537 from one or more low-pressure subsea wells 539. At the moment in time captured by FIG. 5A, valve 585-1 is closed, which prevents the high-pressure fluid 536 from high-pressure subsea well 538-1, via subsea Christmas tree 540-1, from entering the subsea manifold 542. Similarly, valve 585-3 is closed, which prevents the high-pressure fluid 536 from high-pressure subsea well 538-3, via subsea Christmas tree 540-3, from entering the subsea manifold 542.

By contrast, valve 585-2 is open, which allows the high-pressure fluid 536 from high-pressure subsea well 538-2, via subsea Christmas tree 540-2, to enter the subsea manifold 542. In addition, valve 585-4 is closed and valve 585-11 is open, which forces the high-pressure fluid 536 to flow along the high-pressure fluid flow path 561 through valve 585-11 to the inlet 591 of the subsea regenerative turbine 570. When the high-pressure fluid 536 leaves the outlet 592 of the subsea regenerative turbine 570, the high-pressure fluid 536 continues along the high-pressure fluid flow path 562 through valve 585-14, which is open, to exit the subsea manifold 542 (e.g., toward one or more subsea pipelines 248).

In addition, at the moment in time captured by FIG. 5A, valve 585-5 is closed, which prevents the low-pressure fluid 537 from low-pressure subsea well 539-1, via subsea Christmas tree 540-4, from entering the subsea manifold 542. Similarly, valve 585-6 is closed, which prevents the low-pressure fluid 537 from low-pressure subsea well 539-2, via subsea Christmas tree 540-5, from entering the subsea manifold 542. As a result, low-pressure subsea well 539-1 and low-pressure subsea well 539-2 are not in production at that point in time. By contrast, valve 585-7 is open, which allows the low-pressure fluid 537 from low-pressure subsea well 538-3, which is in production at that time, via subsea Christmas tree 540-6, to enter the subsea manifold 542. In addition, valve 585-8 is closed and valve 585-13 is open, which forces the low-pressure fluid 537 to flow along the low-pressure fluid flow path 563 through valve 585-13 to the inlet 597 of the subsea pump assembly 543. When the low-pressure fluid 537 leaves the outlet 596 of the subsea pump assembly 543, the low-pressure fluid 537 continues along the low-pressure fluid flow path 564 through valve 585-16, which is open, to exit the subsea manifold 542 (e.g., toward one or more subsea pipelines 248).

A number of valves 585 keep the low-pressure fluid flow path 563 and the high-pressure fluid flow path 561 separated from each other. Specifically, valve 585-9, valve 585-10, and valve 585-12 are in a closed position, which keeps the low-pressure fluid flow path 563 and the high-pressure fluid flow path 561 separated from each other. Similarly, one or more valves 585 can keep the low-pressure fluid flow path 564 and the high-pressure fluid flow path 562 separated from each other. Specifically, valve 585-15 is closed, which keeps the low-pressure fluid flow path 564 and the high-pressure fluid flow path 562 separated from each other.

In this example, as shown in FIG. 5B, there is an integrated component that includes the subsea regenerative turbine 570 and the subsea pump assembly 543. The regenerative turbine 570 can include one or more components. For example, in this case, the regenerative turbine 570 includes a turbine 556, a shaft 571, and part of an adjustable speed drive 554. (In some cases, the adjustable speed drive 554 can be or include a variable hydraulic or fluid coupling device.) The turbine 556, the shaft 571, and the part of the adjustable speed drive 554 are disposed within a housing 569. The turbine 556 is designed to use energy in a fluid (in this case, the high-pressure fluid 536) to provide a different form of energy to another component (in this case, the subsea pump assembly 543). The turbine 556 includes an inlet 591 and an outlet 592. The inlet 591 is connected to piping 588 at the distal end of the high-pressure fluid flow path 561.

The high-pressure fluid 536 enters the inlet 591, flows through the channels within the turbine 556, and leaves the turbine 556 through the outlet 592, which is connected to other piping 588 and begins the high-pressure fluid flow path 562. As the high-pressure fluid 536 enters the inlet 591 and flows through the channels within the turbine 556, some of its pressure is released to the turbine 556, which converts that energy to rotate the shaft 571, which in turn rotates the top part of the adjustable speed drive 554. The high-pressure fluid 536 has less pressure when it leaves the turbine 556 through the outlet 592 compared to the amount of pressure that the high-pressure fluid 536 has when it enters the inlet 591 of the turbine 556.

The subsea pump assembly 543 can include one or more components. For example, in this case, the subsea pump assembly 543 includes a motor 552, a pump 551, a shaft 572, and the remainder of the adjustable speed drive 554. The motor 552, the pump 551, the shaft 572, and the remainder of the adjustable speed drive 554 are disposed within the housing 569. The rotation of the upper part of the adjustable speed drive 554, part of the subsea regenerative turbine 570, forces the lower part of the adjustable speed drive 554, part of the subsea pump assembly 543, to rotate. This rotation of the lower part of the adjustable speed drive 554 rotates the shaft 572, which in turn operates, in whole or in part, the motor 552 of the subsea pump assembly 543.

As the motor 552 operates, the shaft 572 rotates, which in turn causes the pump 551 to operate. The pump 551 of the subsea pump assembly 543 increases the pressure of the low-pressure fluid 537 within the piping 588 so that the pressure is recategorized from deficient to falling within the range of operational delivery pressure values. Specifically, the low-pressure fluid 537 flows through the piping 588 along the low-pressure fluid flow path 563 to the inlet 597 of the pump 553 of the subsea pump assembly 543, through the pump 533 to the outlet 596 of the pump 553 of the subsea pump assembly 543, and through additional piping 588 along the low-pressure fluid flow path 564 toward the subsea pipelines. As a result, the subsea pump assembly 543, using energy harvested from the high-pressure fluid 536 by the subsea regenerative turbine 570, allows the low-pressure fluid 537 to be produced. The energy generated by the subsea regenerative turbine 570 and directed/delivered to the subsea pump assembly 543 can fully or partially (e.g., act as a supplement for another source of energy) operate the subsea pump assembly 543. In some cases, some or all of the energy generated by a subsea regenerative turbine 570 can be directed to and used by one or more components (an ancillary load) that is not directly associated with the subsea pump assembly 543 or boosting the pressure of the low-pressure fluid 537.

The housing 569 can be rated for use in the environment (e.g., pressure, temperature) in the water 594 where the combination of the subsea regenerative turbine 570 and the subsea pump assembly 543 is located. The housing 569 can allow for various penetrations (e.g., the piping 588-2) therethrough without affecting the operation of the subsea regenerative turbine 570 and/or the subsea pump assembly 543. The housing 569 can be pressurized in any of a number of ways to keep the water 594 from breaching the housing 569. For example, the housing 569 can be pressure retaining to keep the high-pressure water 594 out of the housing 569. As another example, the housing 569 can be pressure compensated, where the housing 569 is filled with some fluid (e.g., oil) and uses one or more mechanisms (e.g., bellow springs, bladders) to equalize the subsea pressure within the housing 569 using pressure compensation. In such cases, the subsea regenerative turbine 570 and/or the subsea pump assembly 543 can use a controller 504, a sensor device 560, a valve 585, and/or any other devices to keep the housing 569 properly pressurized in the water 594.

One or more of the various valves 585 can be adjusted (e.g., manually by a user 251, automatically by a controller 504) over time to account for changes in the condition of one or more high-pressure subsea wells 538 and/or one or more low-pressure subsea wells 539. For example, over time, the pressure of the high-pressure fluid 536 entering the subsea manifold 542 from high-pressure subsea well 538-2 may no longer be high enough to have some of its pressure harvested by the subsea regenerative turbine 570 without needing its own assistance to flow out of the subsea manifold 542 to the subsea pipelines. In such a case, valve 585-2 can be closed to temporarily shut in high-pressure subsea well 538-2, and valve 585-3 can be opened to allow the high-pressure fluid 536 from high-pressure subsea well 538-3 to flow to the subsea regenerative turbine 570. As another example, one or more of the various valves 585 can be adjusted to convert a high-pressure subsea well 538 (e.g., high-pressure subsea well 538-2) to a low-pressure subsea well 539 as the pressure of the high-pressure fluid 536 falls below the range of operational delivery pressure values.

Figure 6A:
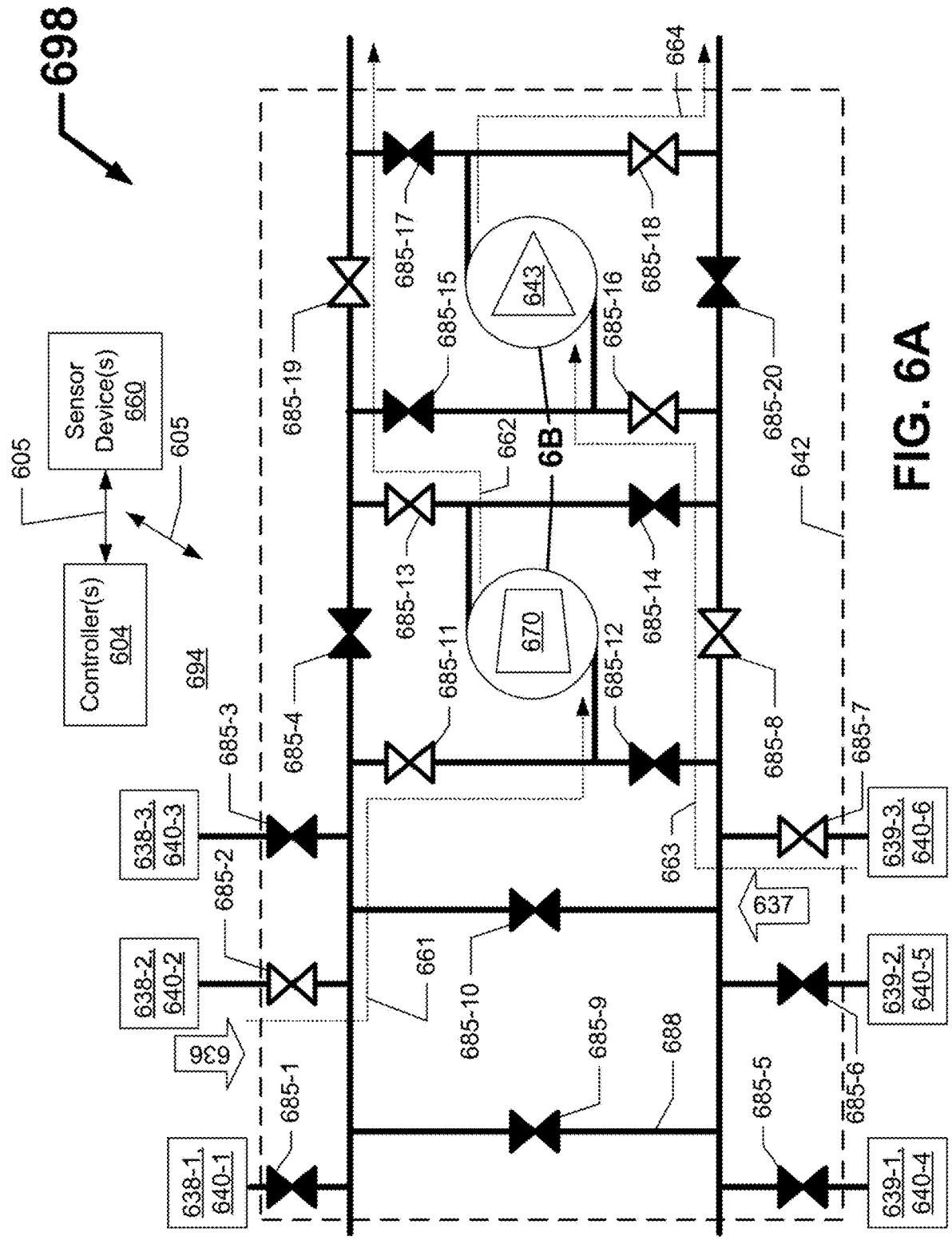
FIGS. 6A and 6B show another subsystem based on the configuration of the system of FIG. 2 for utilizing high pressure subsea reservoir energy to support low-pressure subsea production wells according to certain example embodiments.
Figure 6B:
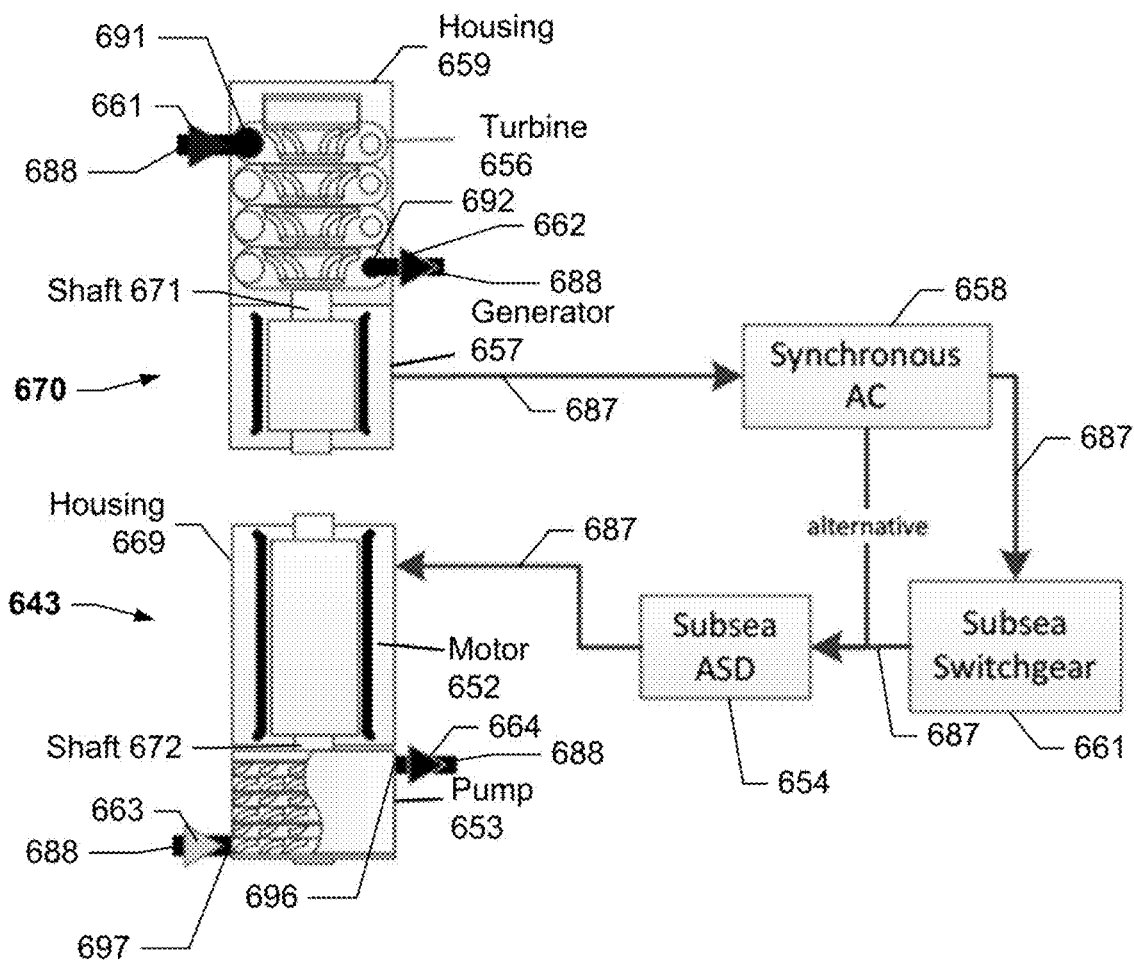

FIGS. 6A and 6B show a subsystem 698 based on the configuration of the system 200 of FIG. 2 for utilizing high pressure subsea reservoir energy to support low-pressure subsea production wells according to certain example embodiments. Specifically, FIG. 6A shows a block diagram of the subsystem 698, and FIG. 6B shows a detailed view of the regenerative turbine 670, the subsea pump assembly 643, and intermediary components of the subsystem 698. Referring to FIGS. 1 through 6B, the subsystem 698 includes a subsea manifold 642, a controller 604, one or more sensor devices 660, a high-pressure fluid 636, a low-pressure fluid 637, three high-pressure subsea wells 638 with associated subsea Christmas trees 640 (high-pressure subsea well 638-1 with subsea Christmas tree 640-1, high-pressure subsea well 638-2 with subsea Christmas tree 640-2, and high-pressure subsea well 638-2 with subsea Christmas tree 640-3), and three low-pressure subsea wells 639 with associated subsea Christmas trees 640 (low-pressure subsea well 639-1 with subsea Christmas tree 640-4, low-pressure subsea well 639-2 with subsea Christmas tree 640-5, and low-pressure subsea well 639-2 with subsea Christmas tree 640-6), all of which are located in water 694.

The subsea manifold 642 includes a subsea regenerative turbine 670, a subsea pump assembly 643, a subsea synchronous motor 658, optional subsea switchgear 661, a subsea adjustable speed drive 654, piping 688, and 20 valves 685 (valve 685-1, valve 685-2, valve 685-3, valve 685-4, valve 685-5, valve 685-6, valve 685-7, valve 685-8, valve 685-9, valve 685-10, valve 685-11, valve 685-12, valve 685-13, valve 685-14, valve 685-15, valve 685-16, valve 685-17, valve 685-18, valve 685-19, and valve 685-20). In alternative embodiments, the subsea synchronous motor 658, the optional subsea switchgear 661, and the subsea adjustable speed drive 654 are not part of the subsea manifold 642, but rather are independent components that are located in the water 694 proximate to the subsea manifold 642.

Generally, the subsea synchronous motor 658, the subsea switchgear 661, and the subsea adjustable speed drive 654 can be considered an ancillary load. In some cases, an ancillary load can include one or more components (e.g., a battery, an ancillary pump motor) that receive electrical power from (and/or other energy output by) a subsea regenerative turbine 670 where such ancillary load is not directly associated with the subsea pump assembly 643 or boosting the pressure of the low-pressure fluid 637.

The subsea manifold 642, the controller 604, the sensor devices 660, the high-pressure fluid 636, the low-pressure fluid 637, the valves 685, the subsea pump assembly 643, the subsea Christmas trees 640, the high-pressure subsea wells 638, the low-pressure subsea wells 639, the piping 688, and the subsea regenerative turbine 670 can be substantially the same as the subsea manifold 242, the controller 204, the sensor devices 260, the high-pressure fluid 236, the low-pressure fluid 237, the valves 285, the subsea pump assembly 243, the subsea Christmas trees 240, the high-pressure subsea wells 238, the low-pressure subsea wells 239, the piping 288, and the subsea regenerative turbine 270 discussed above with respect to FIG. 2.

As discussed above, the subsea manifold 642 can have any of a number of components and/or configurations. In this case, the subsea manifold 642 has piping 688 and a number of valves 685 that are configured to have a high-pressure fluid flow path 661 that receives high-pressure fluid 636 from one or more high-pressure subsea wells 638 and a low-pressure fluid flow path 663 that receives low-pressure fluid 637 from one or more low-pressure subsea wells 639. At the moment in time captured by FIG. 6A, valve 685-1 is closed, which prevents the high-pressure fluid 636 from high-pressure subsea well 638-1, via subsea Christmas tree 640-1, from entering the subsea manifold 642. Similarly, valve 685-3 is closed, which prevents the high-pressure fluid 636 from high-pressure subsea well 638-3, via subsea Christmas tree 640-3, from entering the subsea manifold 642.

By contrast, valve 685-2 is open, which allows the high-pressure fluid 636 from high-pressure subsea well 638-2, via subsea Christmas tree 640-2, to enter the subsea manifold 642. In addition, valve 685-4 is closed and valve 685-11 is open, which forces the high-pressure fluid 636 to flow along the high-pressure fluid flow path 661 through valve 685-11 to the inlet 691 of the subsea regenerative turbine 670. When the high-pressure fluid 636 leaves the outlet 692 of the subsea regenerative turbine 670, the high-pressure fluid 636 continues along the high-pressure fluid flow path 662 through valve 685-13 and valve 685-19, both of which are open, to exit the subsea manifold 642 (e.g., toward one or more subsea pipelines 248).

In addition, at the moment in time captured by FIG. 6A, valve 685-5 is closed, which prevents the low-pressure fluid 637 from low-pressure subsea well 639-1, via subsea Christmas tree 640-4, from entering the subsea manifold 642. Similarly, valve 685-6 is closed, which prevents the low-pressure fluid 637 from low-pressure subsea well 639-2, via subsea Christmas tree 640-5, from entering the subsea manifold 642. As a result, low-pressure subsea well 639-1 and low-pressure subsea well 639-2 are not in production at that point in time. By contrast, valve 685-7 is open, which allows the low-pressure fluid 637 from low-pressure subsea well 638-3, which is in production at that time, via subsea Christmas tree 640-6, to enter the subsea manifold 642. In addition, valve 685-8, valve 685-16, and valve 685-18 are all open and valve 685-12, valve 685-14, and valve 685-20 are all closed, which forces the low-pressure fluid 637 to flow along the low-pressure fluid flow path 663 through valve 685-12 and valve 685-16 to the inlet 697 of the subsea pump assembly 643. When the low-pressure fluid 637 leaves the outlet 696 of the subsea pump assembly 643, the low-pressure fluid 637 continues along the low-pressure fluid flow path 664 through valve 685-18, which is open, to exit the subsea manifold 642 (e.g., toward one or more subsea pipelines 248).

A number of valves 685 keep the low-pressure fluid flow path 663 and the high-pressure fluid flow path 661 separated from each other. Specifically, valve 685-9, valve 685-10, valve 685-12, and valve 685-14 are in a closed position, which keeps the low-pressure fluid flow path 663 and the high-pressure fluid flow path 661 separated from each other. Similarly, one or more valves 685 can keep the low-pressure fluid flow path 664 and the high-pressure fluid flow path 662 separated from each other. Specifically, valve 685-15 and valve 685-17 are closed, which keeps the low-pressure fluid flow path 664 and the high-pressure fluid flow path 662 separated from each other.

The subsea regenerative turbine 670 can include one or more components. For example, as shown in FIG. 6B, the subsea regenerative turbine 670 includes a turbine 656, a shaft 671, and a generator 657. The turbine 656, the shaft 671, and the generator 657 are disposed within a housing 659. The turbine 656, the shaft 671, and the housing 659 of the subsea regenerative turbine 670 of FIG. 6B can be substantially the same as the turbine 556, the shaft 571, and the housing 569 of the subsea regenerative turbine 570 of FIG. 5B.

The turbine 656 includes an inlet 691 and an outlet 692. The inlet 691 is connected to piping 688 at the distal end of the high-pressure fluid flow path 661. The high-pressure fluid 636 enters the inlet 691, flows through the channels within the turbine 656, and leaves the turbine 656 through the outlet 692, which is connected to other piping 688 and begins the high-pressure fluid flow path 662. As the high-pressure fluid 636 enters the inlet 691 and flows through the channels within the turbine 656, some of its pressure is released to the turbine 656, which uses that energy to rotate the shaft 671, which in turn rotates the rotor of the generator 657. The high-pressure fluid 636 has less pressure when it leaves the turbine 656 through the outlet 692 compared to the amount of pressure that the high-pressure fluid 636 has when it enters the inlet 691 of the turbine 656.

As the rotor of the generator 657 rotates within a stator of the generator 657, electrical current is induced in the stator, and the resulting electrical power is sent through a power transfer link 687 (e.g., an electrical cable) to the subsea synchronous motor 658. The electrical power is then sent through additional power transfer links 687 to the subsea adjustable speed drive 654, either directly or through the optional subsea switchgear 661. The subsea adjustable speed drive 654 of FIG. 6B can be substantially the same as the subsea adjustable speed drive 554 of FIG. 5B. The subsea switchgear 661 can include one or more breakers, one or more protective devices (e.g., relays), and/or one or more power transfer devices (e.g., transformer, inverter, converter).

The subsea pump assembly 643 can include one or more components. For example, in this case, the subsea pump assembly 643 includes a motor 652, a pump 651, and a shaft 672. The motor 652, the pump 651, and the shaft 672 are disposed within a housing 669. The motor 652, the pump 651, the shaft 672, and the housing 669 of FIG. 6B can be substantially the same as the motor 552, the pump 551, the shaft 572, and the housing 669 of FIG. 5B. The electrical power flowing from the subsea adjustable speed drive 654 is received by the motor 652 of the subsea pump assembly 643.

As the motor rotates, the shaft 672 attached to the rotor of the motor rotates, causing the pump 651 to operate.

The pump 651 of the subsea pump assembly 643 increases the pressure of the low-pressure fluid 637 within the piping 688 so that the pressure is recategorized from deficient to falling within the range of operational delivery pressure values. Specifically, the low-pressure fluid 637 flows through the piping 688 along the low-pressure fluid flow path 663 to the inlet 697 of the pump 653 of the subsea pump assembly 643, through the pump 633 to the outlet 696 of the pump 653 of the subsea pump assembly 643, and through additional piping 688 along the low-pressure fluid flow path 664 toward the subsea pipelines. As a result, the subsea pump assembly 643, using energy harvested from the high-pressure fluid 636 by the subsea regenerative turbine 670, allows the low-pressure fluid 637 to be produced. The energy generated by the subsea regenerative turbine 670 and directed/delivered to the subsea pump assembly 643 can fully or partially (e.g., act as a supplement for another source of energy) operate the subsea pump assembly 643.

Figure 7:
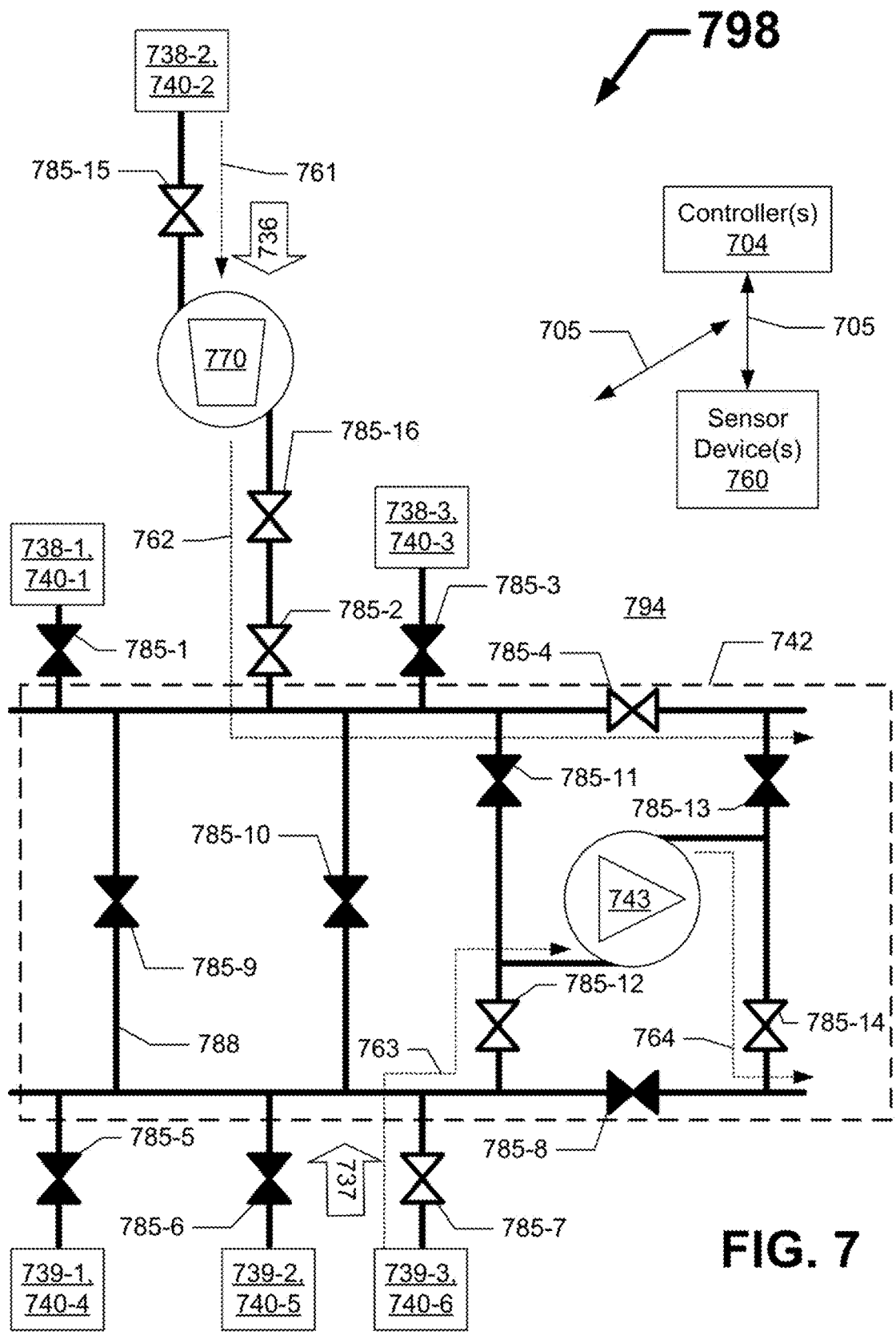
FIG. 7 shows a block diagram of yet another subsystem based on the configuration of the system of FIG. 2 for utilizing high pressure subsea reservoir energy to support low-pressure subsea production wells according to certain example embodiments.

FIG. 7 shows a block diagram of a subsystem 798 based on the configuration of the system 200 of FIG. 2 for utilizing high pressure subsea reservoir energy to support low-pressure subsea production wells according to certain example embodiments. Referring to FIGS. 1 through 7, the subsystem 798 includes a subsea manifold 742, a controller 704, one or more sensor devices 760, a high-pressure fluid 736, a low-pressure fluid 737, three high-pressure subsea wells 738 with associated subsea Christmas trees 740 (high-pressure subsea well 738-1 with subsea Christmas tree 740-1, high-pressure subsea well 738-2 with subsea Christmas tree 740-2, and high-pressure subsea well 738-2 with subsea Christmas tree 740-3), and three low-pressure subsea wells 739 with associated subsea Christmas trees 740 (low-pressure subsea well 739-1 with subsea Christmas tree 740-4, low-pressure subsea well 739-2 with subsea Christmas tree 740-5, and low-pressure subsea well 739-2 with subsea Christmas tree 740-6), all of which are located in water 794.

The subsea manifold 742 in this case includes a subsea pump assembly 743, piping 788, and 14 valves 785 (valve 785-1, valve 785-2, valve 785-3, valve 785-4, valve 785-5, valve 785-6, valve 785-7, valve 785-8, valve 785-9, valve 785-10, valve 785-11, valve 785-12, valve 785-13, and valve 785-14. In this case, the subsea manifold 742 does not include a subsea regenerative turbine 770. Rather, the subsea regenerative turbine 770 is a modular component that is inserted in-line with the piping 788 upstream of the subsea manifold 742. In alternative embodiments, a subsea regenerative turbine 770 is a modular component that can be inserted in-line with the piping 788 downstream of the subsea manifold 742. In either case, piping 688 in the form of bypass lines and/or disconnects (e.g., disconnects 249) can be used to insert and/or remove a subsea regenerative turbine 770 without interrupting the field operation (e.g., a high-pressure subsea well 738 that is in production). There are also two valves 785 located between the low-pressure subsea well 738-2 and the subsea manifold 742. Valve 785-15 is located in-line with the piping 788 upstream of the subsea regenerative turbine 770, and valve 785-16 is located in-line with the piping 788 downstream of the subsea regenerative turbine 770. The subsea regenerative turbine 770 can similarly be inserted in-line with any other high-pressure subsea well 738 upstream of the subsea manifold 742.

The subsea manifold 742, the controller 704, the sensor devices 760, the high-pressure fluid 736, the low-pressure fluid 737, the valves 785, the subsea pump assembly 743, the subsea Christmas trees 740, the high-pressure subsea wells 738, the low-pressure subsea wells 739, the piping 788, and the subsea regenerative turbine 770 can be substantially the same as the subsea manifold 242, the controller 204, the sensor devices 260, the high-pressure fluid 236, the low-pressure fluid 237, the valves 285, the subsea pump assembly 243, the subsea Christmas trees 240, the high-pressure subsea wells 238, the low-pressure subsea wells 239, the piping 288, and the subsea regenerative turbine 270 discussed above with respect to FIG. 2.

As discussed above, the subsea manifold 742 can have any of a number of components and/or configurations. In this case, the subsea manifold 742 has piping 788 and a number of valves 785 that are configured to have a high-pressure fluid flow path 761 that receives high-pressure fluid 736 from one or more high-pressure subsea wells 738 and a low-pressure fluid flow path 763 that receives low-pressure fluid 737 from one or more low-pressure subsea wells 739. At the moment in time captured by FIG. 7, valve 785-1 is closed, which prevents the high-pressure fluid 736 from high-pressure subsea well 738-1, via subsea Christmas tree 740-1, from entering the subsea manifold 742. Similarly, valve 785-3 is closed, which prevents the high-pressure fluid 736 from high-pressure subsea well 738-3, via subsea Christmas tree 740-3, from entering the subsea manifold 742.

By contrast, valve 785-2 is open, which allows the high-pressure fluid 736 from high-pressure subsea well 738-2, via subsea Christmas tree 740-2 and the subsea regenerative turbine 770, to enter the subsea manifold 742. The high-pressure fluid flow path 761 for the high-pressure fluid 736 is located along the piping 788 between the high-pressure subsea well 738-2, through the subsea Christmas tree 740-2, through valve 785-15, and to the inlet of the subsea regenerative turbine 770. In addition, valve 785-4 is open. As a result, when the high-pressure fluid 736 leaves the outlet of the subsea regenerative turbine 770, the high-pressure fluid 736 continues along the high-pressure fluid flow path 762 through valve 785-16, valve 785-2, and valve 785-4, all of which are open, to pass through the subsea manifold 742 (e.g., toward one or more subsea pipelines 248).

In addition, at the moment in time captured by FIG. 7, valve 785-5 is closed, which prevents the low-pressure fluid 737 from low-pressure subsea well 739-1, via subsea Christmas tree 740-4, from entering the subsea manifold 742. Similarly, valve 785-6 is closed, which prevents the low-pressure fluid 737 from low-pressure subsea well 739-2, via subsea Christmas tree 740-5, from entering the subsea manifold 742. As a result, low-pressure subsea well 739-1 and low-pressure subsea well 739-2 are not in production at that point in time. By contrast, valve 785-7 is open, which allows the low-pressure fluid 737 from low-pressure subsea well 738-3, which is in production at that time, via subsea Christmas tree 740-6, to enter the subsea manifold 742. In addition, valve 785-12 is open and valve 785-8 is closed, which forces the low-pressure fluid 737 to flow along the low-pressure fluid flow path 763 through valve 785-12 to the inlet of the subsea pump assembly 743. When the low-pressure fluid 737 leaves the outlet of the subsea pump assembly 743, the low-pressure fluid 737 continues along the low-pressure fluid flow path 764 through valve 785-14, which is open, to exit the subsea manifold 742 (e.g., toward one or more subsea pipelines 248).

A number of valves 785 keep the low-pressure fluid flow path 763 and the high-pressure fluid flow path 762 separated from each other. Specifically, valve 785-9, valve 785-10, and valve 785-11 are in a closed position, which keeps the low-pressure fluid flow path 763 and the high-pressure fluid flow path 762 separated from each other. Similarly, one or more valves 785 can keep the low-pressure fluid flow path 764 and the high-pressure fluid flow path 762 separated from each other. Specifically, valve 785-13 is closed, which keeps the low-pressure fluid flow path 764 and the high-pressure fluid flow path 762 separated from each other.

The subsea regenerative turbine 770 of FIG. 7 can be substantially the same as the subsea regenerative turbine 270 discussed above. For example, the subsea regenerative turbine 770 can be configured (e.g., include a turbine 656, a shaft 671, a generator 657) substantially the same as the subsea regenerative turbine 670 of FIG. 6B. Similarly, the subsea pump assembly 743 of FIG. 7 can be substantially the same as the subsea pump assembly 643 discussed above. For example, the subsea pump assembly 743 can be configured (e.g., include a motor 652, a pump 651, a shaft 672) substantially the same as the subsea pump assembly 643 of FIG. 6B. In such a case, the subassembly 798 can also include a subsea synchronous motor, a subsea adjustable speed drive, and an optional subsea switchgear, as discussed above with respect to FIG. 6B, so that electrical power generated by the subsea regenerative turbine 770 using energy from the high-pressure fluid 736 can be delivered to the subsea pump assembly 743 to boost the pressure of the low-pressure fluid 737. The energy generated by the subsea regenerative turbine 770 and directed/delivered to the subsea pump assembly 743 can fully or partially (e.g., act as a supplement for another source of energy) operate the subsea pump assembly 743.

Figure 8:
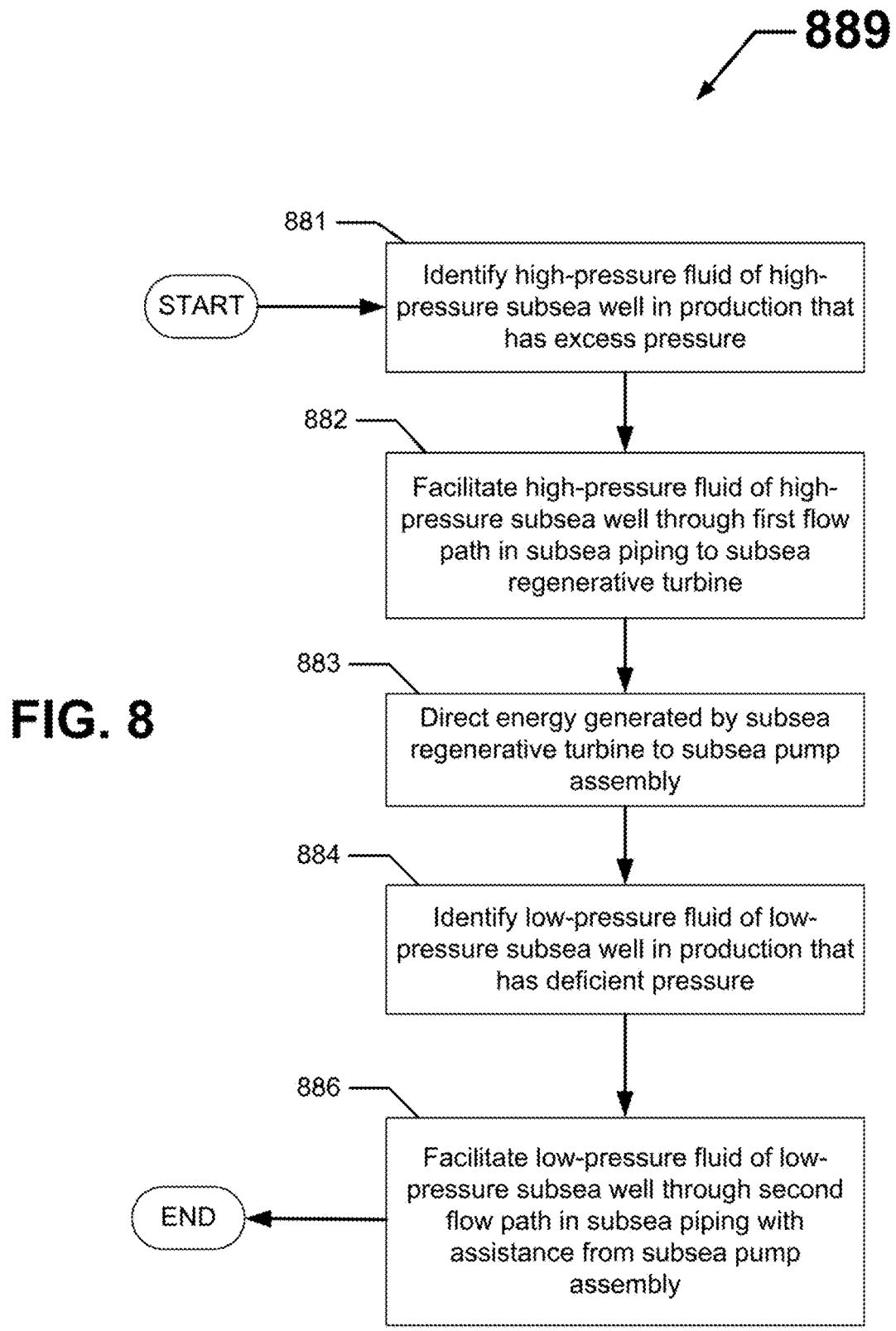
FIG. 8 shows a flowchart of a method for utilizing high pressure subsea reservoir energy to support low-pressure subsea production wells according to certain example embodiments.

FIG. 8 shows a flowchart 889 of a method for utilizing high pressure subsea reservoir energy to support low-pressure subsea production wells according to certain example embodiments. While the various steps in this flowchart 889 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 8 may be included in performing this method. Accordingly, the specific arrangement of steps should not be construed as limiting the scope. Further, a particular computing device, such as the computing device discussed above with respect to FIG. 4, can be used to perform one or more of the steps for the method shown in FIG. 8 in certain example embodiments. Any of the functions performed below by a controller (e.g., controller 204) can involve the use of one or more protocols (e.g., protocols 332), one or more algorithms (e.g., algorithms 333), and/or stored data (e.g., stored data 334). Alternatively, a user (e.g., user 251), including an associated user system (e.g., user system 255) can perform some or all of the method set forth in FIG. 8.

For illustrative purposes, the method shown in FIG. 8 is described an example that can be performed by using the example subsystem 698 based on the system 200 of FIG. 2. The method of FIG. 8 can also be performed using any of the other systems, subsystems (e.g., subsystem 598, subsystem 698, subsystem 798), and/or variations thereof that are described herein. Further, systems for utilizing high pressure subsea reservoir energy to support low-pressure subsea production wells can perform other functions using other methods in addition to and/or aside from those shown in FIG. 8.

Referring to FIGS. 1 through 8, the method shown in the flowchart 889 of FIG. 8 begins at the START step and proceeds to step 881, where a high-pressure fluid 636 of a high-pressure subsea well 638-2 in production is identified as having excess pressure. The pressure of the high-pressure fluid 636 of each high-pressure subsea well 638 can be measured by one or more sensor devices 660. The measurements of pressure made by a sensor device 660 can be evaluated (e.g., determined to be excessive) by a controller 604 using one or more protocols 332 and/or one or more algorithms 333 and/or by a user 251 (including an associated user system 255).

In step 882, the high-pressure fluid 636 of the high-pressure subsea well 638-2 is facilitated through a high-pressure fluid flow path 661 in subsea piping 688 to a subsea regenerative turbine 670. In certain example embodiments, the high-pressure fluid 636 is facilitated through the high-pressure fluid flow path 661 by adjusting (e.g., closing, opening) one or more valves 685 in the subsea manifold 642. Adjustment of the valves 685 can be performed by a user 251 (including an associated user system 255) and/or by a controller 604 using one or more protocols 332 and/or one or more algorithms 333.

In step 883, energy generated by the subsea regenerative turbine 670 is directed to a subsea pump assembly 643. The energy can be directed to the subsea pump assembly 643 using piping 688, electrical cables 687, an adjustable speed drive 554 (which can be or include a variable hydraulic or fluid coupling device), and/or any other means. The energy can be directed to the subsea pump assembly 643 by a controller 604 using one or more protocols 332 and/or one or more algorithms 333 and/or by a user 251 (including an associated user system 255). The energy can be directed or delivered from the subsea regenerative turbine 670 to the subsea pump assembly 643 by operating one or more devices (e.g., switches, breakers, relays, contactors, valves 688) in the system 600. The energy generated by the subsea regenerative turbine 670 and directed/delivered to the subsea pump assembly 643 can be used to fully or partially (e.g., act as a supplement for another source of energy) operate the subsea pump assembly 643.

In step 884, a low-pressure fluid 637 of a low-pressure subsea well 639-3 in production is identified as having deficient pressure. The pressure of the low-pressure fluid 637 of each low-pressure subsea well 639 can be measured by one or more sensor devices 660. The measurements of pressure made by a sensor device 660 can be evaluated (e.g., determined to be deficient) by a controller 604 using one or more protocols 332 and/or one or more algorithms 333 and/or by a user 251 (including an associated user system 255).

In step 886, the low-pressure fluid 637 of the low-pressure subsea well 639-3 is facilitated through a low-pressure fluid flow path 663 in the subsea piping 688 to the subsea pump assembly 643. In certain example embodiments, the low-pressure fluid 637 is facilitated through the low-pressure fluid flow path 663 by adjusting (e.g., closing, opening) one or more valves 685 in the subsea manifold 642. Adjustment of the valves 685 can be performed by a user 251 (including an associated user system 255) and/or by a controller 604 using one or more protocols 332 and/or one or more algorithms 333. When step 886 is complete, the process can proceed to the END step.

The operation of one or more of the valves 685 and/or the decision to operate one or more of the valves 685 and/or how to operate one or more of the valves 685 and/or for how long to leave one or more of the operated valves 685 in the new position can be performed by a user 251 (including an associated user system 255) and/or by a controller 604 using one or more protocols 332 and/or one or more algorithms 333. As another alternative, a subsea regenerative turbine (e.g., subsea regenerative turbine 770) can be physically inserted into and/or removed from a subsystem (e.g., subsystem 798) using disconnects (disconnects 249) integrated with the piping 288 without interrupting the flow of the high-pressure fluid 236 through the piping 288 within, upstream of the subsea manifold 242, or downstream of the subsea manifold 242.

Example embodiments can be used to provide for utilizing, in real time, excess pressure in a high-pressure fluid (a type of subterranean resource) from a high-pressure subsea well in production to boost the pressure of a low-pressure fluid (a type of subterranean resource) from a low-pressure subsea well. Example embodiments can be used during a stage of a field operation when the subterranean resource is directed to a subsea pipeline. Example embodiments are located and performed entirely subsea. In some cases, the electrical power can be generated by an example subsea regenerative turbine in the subsea environment. In other cases, an example subsea regenerative turbine can produce some other type of energy that is used to boost the pressure of a low-pressure fluid. Example embodiments are designed for prolonged reliable operation in spite of the harsh subsea environment in which example embodiments operate. Example embodiments can provide a number of benefits. Such other benefits can include, but are not limited to, improved system efficiency, extended production life of a well, reduced use of resources, cost savings, operational flexibility, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for utilizing high pressure subsea reservoir energy to support low-pressure subsea production wells, the system comprising:
   a high-pressure subsea well in production;
   a first subsea piping that receives a high-pressure fluid of the high-pressure subsea well;
   a low-pressure subsea well in production;
   a second subsea piping that receives a low-pressure fluid of the low-pressure subsea well;
   a subsea regenerative turbine that receives the high-pressure fluid of the high-pressure subsea well from the first subsea piping;
   a subsea pump assembly that operates using energy generated by the subsea regenerative turbine, wherein the subsea pump assembly helps move the low-pressure fluid of the low-pressure subsea well through the second subsea piping; and
   an adjustable speed drive positioned between the subsea pump assembly and the subsea regenerative turbine.

2. The system of claim 1, wherein the subsea pump assembly comprises a subsea pump and a subsea motor, wherein the subsea motor drives the subsea pump.

3. The system of claim 2, wherein the subsea motor of the subsea pump assembly is mechanically coupled to the subsea regenerative turbine.

4. The system of claim 3, wherein the subsea pump assembly and the subsea regenerative turbine form an integrated unit, wherein the integrated unit further comprises the adjustable speed drive positioned between the subsea pump assembly and the subsea regenerative turbine.

5. The system of claim 4, wherein the adjustable speed drive operates mechanically.

6. The system of claim 4, wherein the adjustable speed drive operates hydraulically.

7. The system of claim 1, wherein the subsea regenerative turbine is a modular unit that is integrated with the first subsea piping before the high-pressure fluid of the high-pressure subsea well reaches a high-pressure manifold of the first subsea piping.

8. The system of claim 1, wherein the subsea regenerative turbine is integrated with a high-pressure manifold of the first subsea piping.

9. The system of claim 1, further comprising:
   a plurality of valves integrated with the first subsea piping, wherein the high-pressure subsea well is among a plurality of high-pressure subsea wells that output to the first subsea piping, and wherein the plurality of valves is configured to prevent a remainder of the plurality of high-pressure subsea wells from outputting through the first subsea piping to the subsea regenerative turbine.

10. The system of claim 9, wherein the plurality of valves is reconfigured to allow another one of the plurality of high-pressure subsea wells to output to the first subsea piping to the subsea regenerative turbine.

11. The system of claim 9, wherein the plurality of valves is further integrated with the second subsea piping, wherein the low-pressure subsea well is among a plurality of low-pressure subsea wells that output to the second subsea piping, and wherein the plurality of valves is further configured to prevent a remainder of the plurality of low-pressure subsea wells from outputting through the second subsea piping with support from the subsea pump assembly.

12. The system of claim 11, wherein the plurality of valves is reconfigured to allow another one of the plurality of low-pressure subsea wells to output to the second subsea piping with support from the subsea pump assembly.

13. The system of claim 1, wherein the first subsea piping, the second subsea piping, and the subsea pump assembly are part of a subsea tree.

14. The system of claim 1, further comprising:
   a controller communicably coupled to the subsea regenerative turbine, wherein the controller controls the energy output by the subsea regenerative turbine to the subsea pump assembly.

15. The system of claim 14, further comprising:
   a sensor device communicably coupled to the controller, wherein the sensor device is configured to measure a parameter within a subsea environment and associated with the energy generated by the subsea regenerative turbine.

16. A method for utilizing high pressure subsea reservoir energy to support low-pressure subsea production wells, the method comprising:
- identifying a high-pressure fluid of a high-pressure subsea well in production and having a first pressure that exceeds a range of operational delivery pressure values;
- facilitating flow of the high-pressure fluid of the high-pressure subsea well through a first path in subsea piping to a subsea regenerative turbine;
- directing energy generated by the subsea regenerative turbine to a subsea pump assembly;
- identifying a low-pressure subsea well in production and having a second pressure that falls below the range of operational delivery pressure values; and
- facilitating flow of a low-pressure fluid of the low-pressure subsea well through a second path in the subsea piping with assistance from the subsea pump assembly and an adjustable speed drive positioned between the subsea pump assembly and the subsea regenerative turbine, wherein the subsea pump assembly operates using energy generated by the subsea regenerative turbine when the high-pressure fluid of the high-pressure subsea well flows therethrough.

17. The method of claim 16, further comprising:
- identifying a second low-pressure subsea well in production and having a third pressure that falls below the range of operational delivery pressure values; and
- facilitating flow of a low-pressure fluid of the second low-pressure subsea well through a third path in the subsea piping with assistance from the subsea pump assembly.

18. The method of claim 16, wherein identifying a high-pressure subsea well comprises receiving a measurement of the first pressure by a subsea sensor device.

19. The method of claim 16, wherein facilitating the flow of the high-pressure fluid of the high-pressure subsea well comprises controlling a position of a valve to define the first path and the second path in the subsea piping.

20. A system for utilizing high pressure subsea reservoir energy to support low-pressure subsea production wells, the system comprising:
- a high-pressure subsea well in production;
- a first subsea piping that receives a high-pressure fluid of the high-pressure subsea well;
- a low-pressure subsea well in production;
- a second subsea piping that receives a low-pressure fluid of the low-pressure subsea well;
- a subsea regenerative turbine that receives the high-pressure fluid of the high-pressure subsea well from the first subsea piping;
- a subsea pump assembly that operates using energy generated by the subsea regenerative turbine, wherein the subsea pump assembly helps move the low-pressure fluid of the low-pressure subsea well through the second subsea piping; and
- a plurality of valves integrated with the first subsea piping, wherein the high-pressure subsea well is among a plurality of high-pressure subsea wells that output to the first subsea piping, and wherein the plurality of valves is configured to prevent a remainder of the plurality of high-pressure subsea wells from outputting through the first subsea piping to the subsea regenerative turbine.

* * * * *